(12) United States Patent
Fuji et al.

(10) Patent No.: US 8,546,515 B2
(45) Date of Patent: Oct. 1, 2013

(54) PROCESSES FOR PRODUCING POLYCARBONATE AND MOLDED POLYCARBONATE ARTICLES

(75) Inventors: Michiaki Fuji, Mie (JP); Tomohiko Tanaka, Mie (JP); Minako Akita, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 326 days.

(21) Appl. No.: 12/747,724

(22) PCT Filed: Dec. 10, 2008

(86) PCT No.: PCT/JP2008/072454
§ 371 (c)(1),
(2), (4) Date: Sep. 8, 2010

(87) PCT Pub. No.: WO2009/075304
PCT Pub. Date: Jun. 18, 2009

(65) Prior Publication Data
US 2011/0003101 A1    Jan. 6, 2011

(30) Foreign Application Priority Data

Dec. 12, 2007   (JP) .................. 2007-321408
Dec. 12, 2007   (JP) .................. 2007-321410

(51) Int. Cl.
*C08G 63/02* (2006.01)
*C08G 63/18* (2006.01)

(52) U.S. Cl.
USPC ........................... 528/298; 528/370; 528/371

(58) Field of Classification Search
USPC .................................. 528/298, 370, 371
See application file for complete search history.

(56) References Cited

U.S. PATENT DOCUMENTS

| 4,506,066 A | 3/1985 | Medem et al. |
| 2010/0190953 A1 | 7/2010 | Fuji et al. |

FOREIGN PATENT DOCUMENTS

| GB | 1 079 686 | 8/1967 |
| JP | 56 55425 | 5/1981 |

(Continued)

OTHER PUBLICATIONS

Office Action issued May 9, 2012 in Chinese Patent Application No. 200880119870.3 (with English translation).

(Continued)

*Primary Examiner* — Michael C Miggins
(74) *Attorney, Agent, or Firm* — Oblon, Spivak, McClelland, Maier & Neustadt, L.L.P.

(57) ABSTRACT

A subject for the invention relates to processes for producing a polycarbonate containing a plant-derived starting material and to molded articles thereof, the polycarbonate having excellent mechanical strength, heat resistance, a low refractive index, a large Abbe number, low birefringence, and excellent transparency. The invention relates to a process for producing a polycarbonate which includes a step in which one or more dihydroxy compounds including a dihydroxy compound having at least one linking group —$CH_2$—O— in the molecule thereof are reacted with a carbonic acid diester in the presence of a polymerization catalyst, wherein the dihydroxy compound having at least one linking group —$CH_2$—O— in the molecule thereof has a formic acid content lower than 20 ppm. The invention further relates to a molded article constituted of a polycarbonate or a composition of the polycarbonate, the polycarbonate being a polycarbonate which contains constituent units derived from a dihydroxy compound having at least one linking group —$CH_2$—O— in the molecule thereof and has an Abbe number of 50 or larger and a 5% weight loss temperature of 340° C. or higher.

11 Claims, 2 Drawing Sheets

(56) References Cited

FOREIGN PATENT DOCUMENTS

| | | | |
|---|---|---|---|
| JP | 63 12896 | | 3/1988 |
| JP | 6 145336 | | 5/1994 |
| JP | 2006 232897 | | 9/2006 |
| JP | 2006232897 | * | 9/2006 |
| WO | 2004 111106 | | 12/2004 |
| WO | 2006 004022 | | 1/2006 |
| WO | 2007/013463 | A1 | 2/2007 |
| WO | WO 2007/063823 | A1 | 6/2007 |
| WO | 2007 148604 | | 12/2007 |
| WO | 2008 029746 | | 3/2008 |
| WO | 2008 093860 | | 8/2008 |
| WO | 2008 143269 | | 11/2008 |
| WO | 2008 146719 | | 12/2008 |

OTHER PUBLICATIONS

U.S. Appl. No. 12/808,058, filed Jun. 14, 2010, Fuji et al.
Office Action issued Oct. 29, 2012 in Korean Patent Application No. 10-2010-7012758 (with English-language translation).
Korean Office Action issued Mar. 21, 2012, in Korea Patent Application No. 2010-7012758 (with English translation).
Chinese Office Action issued Oct. 10, 2011 in Patent Application No. 200880119870.3 (with English translation).
Office Action dated May 30, 2013 issued in Taiwanese Patent Application No. 097148423 filed Dec. 12, 2008 (w/ English Translation).
Extended European Search report dated Jul. 23, 2013 issued in corresponding EP patent application No. 08858432.1.

* cited by examiner

PROCESSES FOR PRODUCING POLYCARBONATE AND MOLDED POLYCARBONATE ARTICLES

CROSS-REFERENCE TO RELATED APPLICATIONS

This application is a National Stage of PCT/JP2008/072454 filed on Dec. 10, 2008. This application is based upon and claims the benefit of priority to Japanese Application No. 2007-321408 filed on Dec. 12, 2007, and to Japanese Application No. 2007-321410 filed on Dec. 12, 2007, the entire contents of thereof are incorporated herein by reference.

BACKGROUND OF THE INVENTION

1. Technical Field

The present invention relates to processes for producing a polycarbonate which contains constituent units capable of being derived from glucides, e.g., starches, as biomass resources and which has excellent heat resistance, moldability, and mechanical strength and has excellent optical properties including a low refractive index and a large Abbe number. The invention further relates to a polycarbonate obtained by the processes and to molded articles formed from the polycarbonate or a composition thereof.

2. Background Art

In general, polycarbonates are produced from raw materials induced from oil resources. In recent years, however, there is a fear about the depletion of oil resources, and polycarbonates produced from raw materials obtained from biomass resources such as plants are desired to be supplied. In addition, since there also is a fear that global warming caused by an increase in carbon dioxide emission and accumulation thereof may bring about climate changes, there is a desire for the development of a polycarbonate which is produced using a plant-derived monomer as a starting material and is carbon-neutral even when discarded after being used.

A method in which isosorbide is used as a plant-derived monomer to obtain a polycarbonate through transesterification with diphenyl carbonate has hitherto been proposed (see, for example, patent document 1). However, the polycarbonate obtained is brown and unsatisfactory. As a copolycarbonate produced from isosorbide and another dihydroxy compound, a polycarbonate obtained through copolymerization with bisphenol A has been proposed (see, for example, patent document 2). Furthermore, an attempt has been made to improve the stiffness characteristics of the homo-polycarbonate produced from isosorbide, by copolymerizing isosorbide and an aliphatic diol (see, for example, patent document 3).

On the other hand, many proposals have been made on polycarbonates obtained by polymerizing 1,4-cyclohexanedimethanol, which is an alicyclic dihydroxy compound (see, for example, patent documents 4 and 5). However, these polycarbonates have a molecular weight as low as about 4,000 at the most and, hence, many of these have a low glass transition temperature.

As stated above, polycarbonates produced using isosorbide have been proposed. However, no report has been made on a polycarbonate obtained by copolymerizing isosorbide and an alicyclic dihydroxy compound, and optical constants such as refractive index and Abbe number have not been disclosed.

Patent Document 1: British Patent No. 1079686, description
Patent Document 2: JP-A-56-55425
Patent Document 3: International Publication No. 2004/111106, pamphlet
Patent Document 4: JP-A-6-145336
Patent Document 5: JP-B-63-12896

DISCLOSURE OF THE INVENTION

Problems that the Invention is to Solve

The polycarbonates described in patent documents 1 to 5 are insufficient in heat resistance and transparency as compared with conventional aromatic polycarbonates derived from petroleum feedstocks, and it has been difficult to use those polycarbonates as optical materials or molding materials. It is therefore desired to develop a highly transparent polycarbonate having a low refractive index and a small Abbe number while retaining the high heat resistance and transparency of aromatic polycarbonates.

An object of the invention is to eliminate the conventional problems and provide a process for producing a polycarbonate which contains plant-derived constituent units and which has excellent mechanical strength, heat resistance, a low refractive index, a large Abbe number, reduced birefringence, and excellent transparency. Another object is to provide a molded article formed from the polycarbonate or a composition thereof.

Means for Solving the Problems

The present inventors diligently made investigations in order to overcome the problems. As a result, they have found that a polycarbonate obtained from a dihydroxy compound having at least one linking group —$CH_2$—O— in the molecule thereof, for example, a dihydroxy compound represented by the following general formula (1), and an alicyclic dihydroxy compound has excellent mechanical strength, heat resistance, a low refractive index, a large Abbe number, reduced birefringence, and excellent transparency. The inventors have further found that decomposition products including formic acid and stabilizers are present in dihydroxy compounds having at least one linking group —$CH_2$—O— in the molecule thereof, for example, a dihydroxy compound represented by the following general formula (1), and these substances affect polymerization reactions, and that a high-quality polycarbonate can be stably and efficiently produced when use is made of a dihydroxy compound having at least one linking group —$CH_2$—O— in the molecule thereof, for example, a dihydroxy compound represented by the following general formula (1), which has at least a low formic acid content and a low alkali metal content. The invention has been achieved on the basis of these findings.

Namely, essential points of the invention reside in the following [1] to [32].

[1] A process for producing a polycarbonate which includes a step in which one or more dihydroxy compounds comprising a dihydroxy compound having at least one linking group —$CH_2$—O— in the molecule thereof are reacted with a carbonic acid diester in the presence of a polymerization catalyst, characterized in that the dihydroxy compound having at least one linking group —$CH_2$—O— in the molecule thereof has a formic acid content lower than 20 ppm.

[2] The process according to [1], wherein the dihydroxy compound having at least one linking group —$CH_2$—O— in the molecule thereof is a dihydroxy compound represented by the following general formula (1).

[Chem. 1]

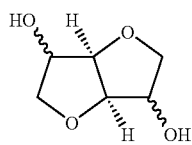

(1)

[3] The process according to [1] or [2], wherein the polymerization catalyst comprises an alkali and/or alkaline earth metal compound, and the alkali and/or alkaline earth metal compound is used in an amount in the range of from 0.1 μmol to 25 μmol in terms of the amount of the metal(s) per mole of all dihydroxy compounds to be subjected to the reaction,
the amount of an alkali and/or alkaline earth metal compound contained in all dihydroxy compounds being 10 μmol or smaller in terms of the amount of the metal(s) per mole of all dihydroxy compounds to be subjected to the reaction.

[4] A process for producing a polycarbonate which includes a step in which one or more dihydroxy compounds comprising a dihydroxy compound having at least one linking group —$CH_2$—O— in the molecule thereof are reacted with a carbonic acid diester in the presence of a polymerization catalyst,
characterized in that the polymerization catalyst comprises an alkali and/or alkaline earth metal compound, and the alkali and/or alkaline earth metal compound is used in an amount in the range of from 0.1 μmol to 25 μmol in terms of the amount of the metal(s) per mole of all dihydroxy compounds to be subjected to the reaction,
the amount of an alkali and/or alkaline earth metal compound contained in all dihydroxy compounds being 10 μmol or smaller in terms of the amount of the metal(s) per mole of all dihydroxy compounds to be subjected to the reaction.

[5] The process according to [4], wherein the dihydroxy compound having at least one linking group —$CH_2$—O— in the molecule thereof is a dihydroxy compound represented by the following general formula (1).

[Chem. 2]

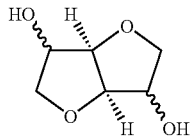

(1)

[6] The process according to [4] or [5], wherein the dihydroxy compound having at least one linking group —$CH_2$—O— in the molecule thereof has a formic acid content lower than 20 ppm.

[7] The process according to any one of [1] to [6], wherein the dihydroxy compound having at least one linking group —$CH_2$—O— in the molecule thereof has a formic acid content of 10 ppm or lower.

[8] The process according to any one of [2], [3], and [5] to [7], wherein the dihydroxy compound represented by general formula (1) is the dihydroxy compound which has been stored under conditions including at least one selected from the group consisting of in an inert gas atmosphere, in a reduced-pressure atmosphere, in the presence of a free-oxygen absorber, in the presence of a desiccant, and at a temperature of 40° C. or lower.

[9] The process according to any one of [2], [3], and [5] to [8], wherein the dihydroxy compound represented by general formula (1) is subjected in a liquid state to the reaction with the carbonic acid diester.

[10] The process according to any one of [1] to [9], wherein the dihydroxy compounds further include at least one dihydroxy compound selected from the group consisting of alicyclic dihydroxy compounds, aliphatic dihydroxy compounds, oxyalkylene glycols, aromatic dihydroxy compounds, and diols having a cyclic ether structure.

[11] The process according to any one of [2], [3], and [5] to [10], wherein the proportion of the dihydroxy compound represented by general formula (1) to all dihydroxy compounds is 10% by mole or higher.

[12] A polycarbonate obtained by the process according to any one of [1] to [1H].

[13] A molded article comprising the polycarbonate according to [12] or a composition of the polycarbonate.

[14] A molded article characterized by comprising a polycarbonate copolymer or a composition of the copolymer, the polycarbonate copolymer being a polycarbonate copolymer which contains constituent units derived from a dihydroxy compound having at least one linking group —$CH_2$—O— in the molecule thereof and constituent units derived from an alicyclic dihydroxy compound and has an Abbe number of 50 or larger and a 5% weight loss temperature of 340° C. or higher.

[15] The molded article according to [14], wherein the dihydroxy compound having at least one linking group —$CH_2$—O— in the molecule thereof is a dihydroxy compound represented by the following general formula (1).

[Chem. 3]

(1)

[16] A molded article characterized by comprising a polycarbonate copolymer or a composition of the copolymer, the polycarbonate copolymer being a polycarbonate copolymer which contains constituent units derived from a dihydroxy compound having at least one linking group —$CH_2$—O— in the molecule thereof and constituent units derived from an alicyclic dihydroxy compound and in which the proportion of the dihydroxy compound having at least one linking group —$C_2$—O— in the molecule thereof and the alicyclic dihydroxy compound to all dihydroxy compounds constituting the copolymer is 80% by mole or higher.

[17] The molded article according to [16], wherein the dihydroxy compound having at least one linking group —$CH_2$—O— in the molecule thereof is a dihydroxy compound represented by the following general formula (1).

[Chem. 4]

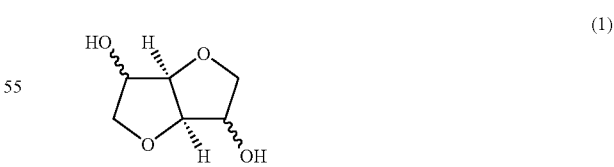

(1)

[18] The molded article according to [17], wherein the proportion of the dihydroxy compound represented by general formula (1) and the alicyclic dihydroxy compound to all dihydroxy compounds constituting the polycarbonate copolymer is 80% by mole or higher.

[19] The molded article according to any one of [14] to [18], wherein the alicyclic dihydroxy compound contains a five-membered ring structure or a six-membered ring structure.

[20] The molded article according to [19], wherein the alicyclic dihydroxy compound contains 30 or less carbon atoms.
[21] The molded article according to [20], wherein the alicyclic dihydroxy compound is at least one compound selected from the group consisting of cyclohexanedimethanol, tricyclodecanedimethanol, adamantanediol, and pentacyclopentadecanedimethanol.
[22] The molded article according to any one of [15] and [17] to [21], wherein the polycarbonate copolymer contains constituent units derived from at least one member selected from the group consisting of isosorbide, isomannide, and isoidide, as the constituent units derived from the dihydroxy compound represented by general formula (1).
[23] The molded article according to any one of [13] to [22], wherein the polycarbonate or the polycarbonate copolymer has a photoelastic coefficient of $20 \times 10^{12}$ $Pa^{-1}$ or lower.
[24] The molded article according to any one of [13] to [23], wherein the polycarbonate or the polycarbonate copolymer has an Izod impact strength of 30 $J/m^2$ or higher.
[25] The molded article according to any one of [13] to [24], wherein the amount of any gas, other than phenol ingredients, which generates per unit area from the polycarbonate or the polycarbonate copolymer at 110° C. is 5 $ng/cm^2$ or smaller.
[26] The molded article according to any one of [13] to [25], wherein a solution of the polycarbonate or the polycarbonate copolymer in phenol/1,1,2,2-tetrachloroethane=1/1 (by weight), the solution having a concentration of 1.00 g/dL, has a reduced viscosity of 0.40 dL/g or higher at 30° C.±0.1° C.
[27] The molded article according to any one of [13] to [26], which is a film or a sheet.
[28] The molded article according to any one of [13] to [26], which is a container.
[29] The molded article according to any one of [13] to [26], which is an optical material or an optical part.
[30] The molded article according to any one of [13] to [26], which is a lens.
[31] The molded article according to any one of [13] to [26], which is a film for optical use.
[32] A display device characterized by employing the molded article according to [31].

Effects of the Invention

According to the processes of the invention, a high-quality polycarbonate reduced in coloration, etc. can be stably and efficiently produced. The polycarbonate of the invention has high thermal stability, a low refractive index, a large Abbe number, low optical anisotropy, and excellent mechanical strength and can be regulated so as to have a glass transition temperature in the range of, for example, from 45° C. to 155° C. according to applications. The polycarbonate can hence be provided as materials for a wide range of fields including the field of films or sheets where flexibility is necessary, the field of bottles or containers where heat resistance is necessary, lens applications such as camera lenses, finder lenses, and lenses for CCDs or CMOSs, films for optical use, such as retardation films, diffusion sheets, and polarizing films for use in liquid-crystal or plasma displays or the like, and binder applications where sheets, optical disks, optical materials, optical parts, pigments, charge transfer agents and the like are fixed.

BEST MODE FOR CARRYING OUT THE INVENTION

Figure 1:
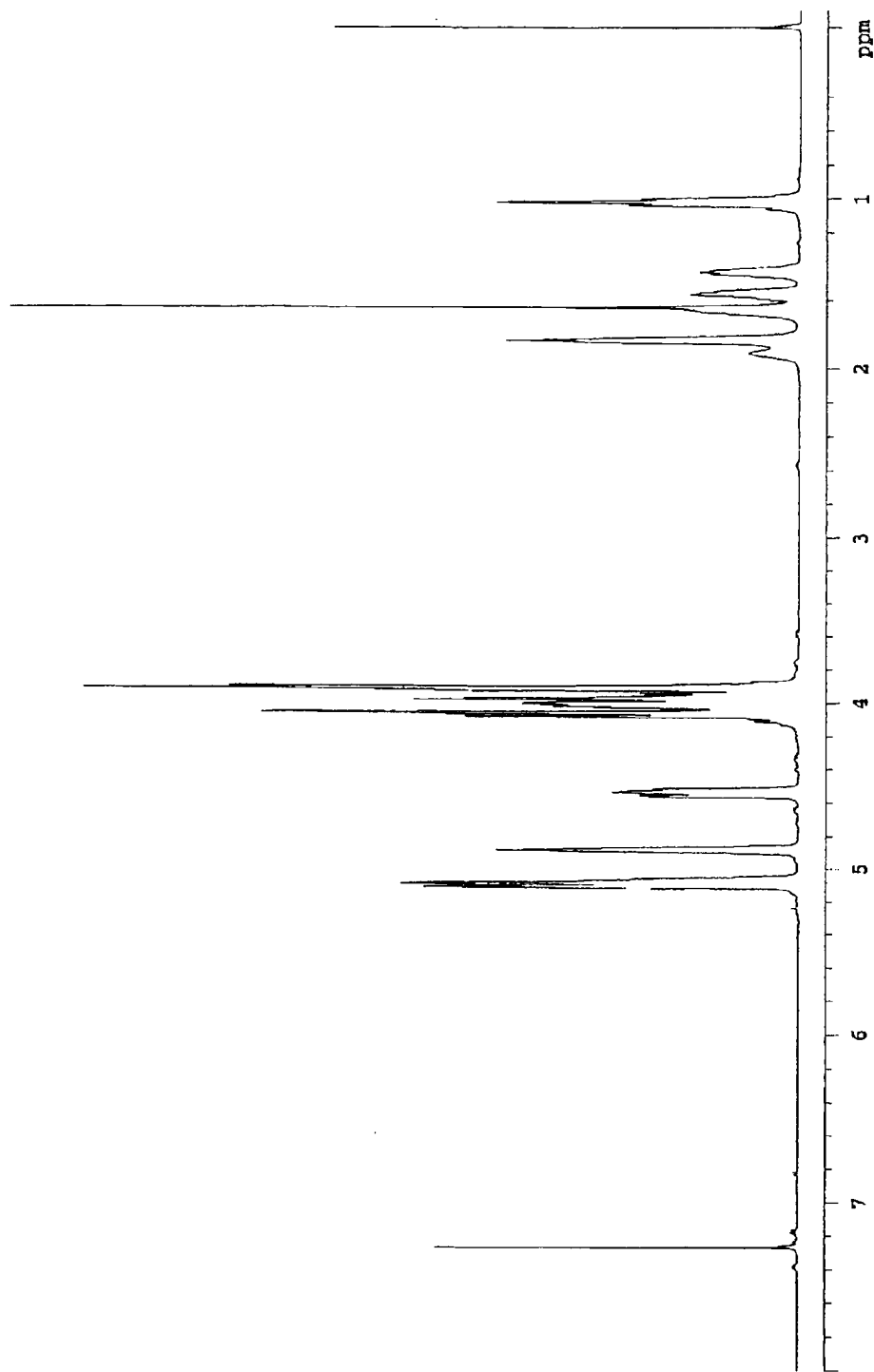
FIG. 1 is a presentation showing an NMR chart of the polycarbonate produced in Example 1.

Embodiments of the invention are explained below in detail. The following explanations on constituent elements are for embodiments (typical embodiments) of the invention, and the invention should not be construed as being limited to the following unless the invention departs from the spirit thereof.

As described under [1] above, one of the processes for polycarbonate production of the invention is a process for producing a polycarbonate which includes a step in which one or more dihydroxy compounds comprising a dihydroxy compound having at least one linking group —$CH_2$—O— in the molecule thereof are reacted with a carbonic acid diester in the presence of a polymerization catalyst,
and is characterized in that the dihydroxy compound having at least one linking group —$CH_2$—O— in the molecule thereof has a formic acid content lower than 20 ppm.

The process for polycarbonate production according to another aspect of the invention, as described under [4] above, is a process for producing a polycarbonate which includes a step in which one or more dihydroxy compounds comprising a dihydroxy compound having at least one linking group —$CH_2$—O— in the molecule thereof are reacted with a carbonic acid diester in the presence of a polymerization catalyst,
and is characterized in that the polymerization catalyst comprises an alkali and/or alkaline earth metal compound, and the alkali and/or alkaline earth metal compound is used in an amount in the range of from 0.1 µmol to 25 µmol in terms of the amount of the metal(s) per mole of all dihydroxy compounds to be subjected to the reaction, the amount of an alkali and/or alkaline earth metal compound contained in all dihydroxy compounds being 10 µmol or smaller in terms of the amount of the metal(s) per mole of all dihydroxy compounds to be subjected to the reaction.

One of the molded articles of the invention, as described under [13] above, is constituted of either the polycarbonate obtained by any of the processes for polycarbonate production of the invention or a composition of the polycarbonate.

Another molded article of the invention, as described under [14] above, is a molded article characterized by being constituted of a polycarbonate copolymer or a composition of the copolymer, the polycarbonate copolymer being a polycarbonate copolymer which contains constituent units derived from a dihydroxy compound having at least one linking group —$CH_2$—O— in the molecule thereof and constituent units derived from an alicyclic dihydroxy compound and has an Abbe number of 50 or larger and a 5% weight loss temperature of 340° C. or higher.

The molded article according to another aspect of the invention, as described under [16] above, is a molded article characterized by being constituted of a polycarbonate copolymer or a composition of the copolymer, the polycarbonate copolymer being a polycarbonate copolymer which contains constituent units derived from a dihydroxy compound having at least one linking group —$CH_2$—O— in the molecule thereof and constituent units derived from an alicyclic dihydroxy compound and in which the proportion of the dihydroxy compound having at least one linking group —$CH_2$—O— in the molecule thereof and the alicyclic dihydroxy compound to all dihydroxy compounds constituting the copolymer is 80% by mole or higher.

As described above, one requirement for the present invention is to use one or more "dihydroxy compounds having at least one linking group —CH₂—O— in the molecule thereof" (hereinafter, these compounds are sometimes referred to as "dihydroxy compounds (I)").

The dihydroxy compounds (I) may be compounds of any structure so long as these compounds each have two alcoholic hydroxyl groups, contain in the molecule a structure having a linking group —CH₂—O—, and are capable of reacting with a carbonic acid diester in the presence of a polymerization catalyst to yield a polycarbonate.

The "linking group —CH₂—O—" in the dihydroxy compounds (I) means a structure which combines at each end with an atom other than a hydrogen atom to constitute the molecule. For such connecting groups, a carbon atom is most preferred as the atom with which at least the oxygen atom can combine or as the atom with which both the carbon atom and the oxygen atom can combine. The number of "linking groups —CH₂—O—" in each dihydroxy compound (I) is 1 or larger, preferably 2 to 4.

Specifically, examples of the dihydroxy compounds (I) include compounds having an aromatic group as a side chain and having, in the main chain, ether groups each bonded to an aromatic group, such as 9,9-bis(4-(2-hydroxyethoxy)-phenyl)fluorene, 9,9-bis(4-(2-hydroxyethoxy)-3-methylphenyl) fluorene, 9,9-bis(4-(2-hydroxyethoxy)-3-isopropylphenyl) fluorene, 9,9-bis(4-(2-hydroxyethoxy)-3-isobutyl-phenyl) fluorene, 9,9-bis(4-(2-hydroxyethoxy)-3-tert-butylphenyl) fluorene, 9,9-bis(4-(2-hydroxyethoxy)-3-cyclohexylphenyl) fluorene, 9,9-bis(4-(2-hydroxyethoxy)-3-phenylphenyl) fluorene, 9,9-bis(4-(2-hydroxyethoxy)-3,5-dimethylphenyl) fluorene, 9,9-bis(4-2-hydroxyethoxy)-3-tert-butyl-6-methylphenyl)fluorene, and 9,9-bis(4-(3-hydroxy-2,2-dimethylpropoxy)phenyl)fluorene, anhydrous sugar alcohols represented by the dihydroxy compounds represented by the following general formula (1), and diols having a cyclic ether structure, such as, e.g., the spiro-glycol represented by the following formula (2).

[Chem. 5]

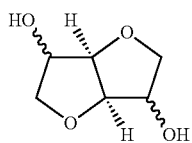
(1)

[Chem. 6]

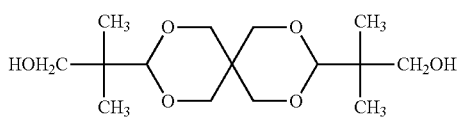
(2)

Those dihydroxy compounds (I) may be used either alone or in combination of two or more thereof. Those dihydroxy compounds (I) other than the dihydroxy compounds represented by general formula (1) can be used also as "other dihydroxy compounds", which will be described later.

As stated above, one or more dihydroxy compounds (I), e.g., a dihydroxy compound represented by general formula (1), which have a formic acid content lower than 20 ppm are used in the invention. The formic acid content thereof is preferably 10 ppm or lower, more preferably 5 ppm or lower, even more preferably 3 ppm or lower. It is especially preferred that the dihydroxy compounds (I) should contain no formic acid generated by, for example, the decomposition of the dihydroxy compounds (I). By using, as starting materials, the dihydroxy compounds (I), e.g., a dihydroxy compound represented by general formula (1), which have such a high purity, the problems encountered in polymerization reactions which will be described later are overcome and a high-quality polycarbonate reduced in coloration, etc. can be stably and efficiently produced.

As stated above, in the processes of the invention, an alkali and/or alkaline earth metal compound may be used as the polymerization catalyst in an amount in a specific range, and one or more dihydroxy compounds (I) in which the concentration of an alkali and/or alkaline earth metal compound is not higher than a specific value are used as a starting material.

The amount (addition amount) of the alkali and/or alkaline earth metal compound to be used as the polymerization catalyst is preferably from 0.1 μmol to 25 μmol, more preferably from 0.50 μmol to 20 μmol, in terms of the amount of the metal(s) per mole of all dihydroxy compounds to be subjected to the reaction.

Furthermore, the amount of an alkali and/or alkaline earth metal compound contained in all dihydroxy compounds is preferably 10 μmol or smaller, more preferably 5 μmol or smaller, in terms of the amount of the metal(s) per mole of all dihydroxy compounds to be subjected to the reaction.

Thus, the polymerization reaction can be controlled without fail, and a high-quality polycarbonate can be stably and efficiently produced.

In the invention, examples of the dihydroxy compounds represented by general formula (1) include isosorbide, isomannide, and isoidide, which are stereoisomers. These compounds may be used either alone or in combination of two or more thereof.

Most preferred of these dihydroxy compounds (I) is isosorbide from the standpoints of availability, ease of production, optical properties, and moldability. Isosorbide is obtained by the dehydrating condensation of sorbitol, which is produced from various starches that are abundant resources and are easily available.

Isosorbide is apt to be gradually oxidized by oxygen. It is therefore important during storage or in handling during production that a free-oxygen absorber or a nitrogen atmosphere should be used in order to prevent decomposition by oxygen. It is also necessary to prevent water inclusion. Oxidation of isosorbide generates decomposition products including formic acid. In the case where isosorbide containing these decomposition products, for example, is used to produce a polycarbonate, these decomposition products cause coloration of the polycarbonate obtained or considerable deterioration of the properties thereof. There are even the cases where the decomposition products affect the polymerization reaction, making it impossible to obtain a high-molecular polymer.

In the case where stabilizers serving to prevent the generation of formic acid have been added, some kinds of stabilizers cause coloration of the polycarbonate obtained or considerably impair the properties thereof. As the stabilizers, use is made of reducing agents and antacids. Examples of the reducing agents include sodium borohydride and lithium borohydride, while examples of the antacids include alkalis such as sodium hydroxide. However, when such an alkali metal salt is added, there are the cases where excessive addition thereof makes it impossible to control the polymerization reaction because the alkali metal functions also as a polymerization catalyst.

Isosorbide may be distilled according to need in order to obtain isosorbide containing no decomposition products. Also in the case where stabilizers have been incorporated in order to prevent the isosorbide from being oxidized or decomposed, this isosorbide may be distilled according to need in order to remove these stabilizers. In this case, the distillation of the isosorbide may be simple distillation or continuous distillation, and is not particularly limited. With respect to the atmosphere, an inert gas atmosphere such as, e.g., argon or nitrogen is formed before the isosorbide is distilled at a reduced pressure.

By subjecting, for example, isosorbide to such distillation, high-purity isosorbide having a formic acid content of below 20 ppm, preferably 10 ppm or lower, more preferably 5 ppm or lower, even more preferably 3 ppm or lower, or especially preferably containing no formic acid can be obtained. Simultaneously therewith, the content of an alkali and/or alkaline earth metal compound can be reduced to 10 μmol or lower, preferably 5 μmol or lower, more preferably 3 μmol or lower, even more preferably 1 μmol or smaller, in terms of the amount of the metal(s) per mole of the isosorbide. Especially preferably, high-purity isosorbide containing no alkali and/or alkaline earth metal compound can be obtained.

Methods for determining the contents of formic acid and an alkali and/or alkaline earth metal compound in isosorbide and a method for distilling isosorbide will be described later in Examples.

Specific means for subjecting a dihydroxy compound (I), for example, a dihydroxy compound represented by general formula (1), which has been thus reduced in the content of formic acid or of an alkali and/or alkaline earth metal compound to reaction with a carbonic acid diester are not particularly limited. For example, the following method can be employed.

The high-purity dihydroxy compound (I), for example, a dihydroxy compound represented by general formula (1), is stored in an oxygen-free atmosphere, preferably such as an inert gas atmosphere or a reduced-pressure or vacuum atmosphere, until the time when the compound (I) is subjected to reaction with a carbonic acid diester. In the case where the compound (I), after having been taken out of the storage atmosphere, is stored in an environment of 40° C. and 80% RH, it is preferred that the dihydroxy compound (I) should be supplied to a system for reaction with a carbonic acid diester within generally 2 weeks, more preferably within 1 week. So long as the dihydroxy compound represented by general formula (1) is stored in an environment of 40° C. and 80% RH, this compound is not inhibited from polymerizing even when allowed to stand in the air for a period of generally up to 2 weeks, preferably up to 1 week. The storage period can be prolonged when the temperature or humidity is lower than 40° C. or 80% RH, respectively.

Examples of the inert gas atmosphere include an atmosphere of one or more of nitrogen, argon, and the like, the atmosphere having an oxygen content of 1,000 ppm or lower, in particular, containing no oxygen. Examples of the reduced-pressure atmosphere include an atmosphere having a pressure of 13.3 kPa or lower and an oxygen content of 100 ppm or lower. In this storage system, a free-oxygen absorber including an iron powder as a main component, e.g., a free-oxygen absorber such as Ageless (manufactured by Mitsubishi Gas Chemical Co., Ltd.) or Oxy-Eater (manufactured by Ueno Fine Chemicals Industry, Ltd.), and a desiccant such as silica gel, a molecular sieve, or aluminum oxide may be made present according to need.

Furthermore, since oxidation of the dihydroxy compound (I), for example, isosorbide, generates decomposition products including formic acid, it is also effective to store the compound (I) at a low temperature in order to prevent the generation.

When stored at a temperature of 40° C. or lower, the dihydroxy compound (I) can be subjected to polymerization for at least one month so long as a free-oxygen absorber is made to coexist therewith and an inert gas atmosphere environment having an oxygen concentration of 1,000 ppm or lower is maintained. The storage temperature is 40° C. or lower, preferably 25° C. or lower, more preferably 10° C. or lower, especially preferably 5° C. or lower.

Although isosorbide in a powder or flaky state can be stored even at a high humidity of 80% RH, the isosorbide changes in weight due to moisture absorption. It is therefore preferred to store the isosorbide in a sealed moisture-proof aluminum bag or the like or in an inert gas atmosphere in order to prevent moisture absorption.

A suitable combination of those conditions can be used.

When a dihydroxy compound (I), for example, a dihydroxy compound represented by general formula (1), is subjected to reaction with the carbonic acid diester which will be described later, the state of the compound (I) is not particularly limited. The compound (I) may be in a powder state or flaky state or may be in a liquid state such as a molten state or an aqueous solution.

In the invention, dihydroxy compounds other than the dihydroxy compounds (I) can be used together with a dihydroxy compound (I), for example, a dihydroxy compound represented by general formula (1), as dihydroxy compounds forming constituent units of the polycarbonate. Examples of such dihydroxy compounds other than the dihydroxy compounds (I) include alicyclic dihydroxy compounds, aliphatic dihydroxy compounds, oxyalkylene glycols, aromatic dihydroxy compounds, and diols having a cyclic ether structure.

The alicyclic dihydroxy compounds usable in the invention are not particularly limited. However, compounds including a five-membered ring structure or six-membered ring structure are usually used. The six-membered ring structure may have a fixed chair or boat form constituted of covalent bonds. When an alicyclic dihydroxy compound of a five-membered ring or six-membered ring structure is used, the polycarbonate obtained can have enhanced heat resistance. The number of carbon atoms contained in each alicyclic dihydroxy compound is generally 70 or smaller, preferably 50 or smaller, more preferably 30 or smaller. The larger the number thereof, the higher the heat resistance. However, such an alicyclic dihydroxy compound is difficult to synthesize or difficult to purify or has a high cost. The smaller the number of carbon atoms, the easier the purification or procurement of the alicyclic dihydroxy compound.

Examples of the alicyclic dihydroxy compounds including a five-membered ring structure or six-membered ring structure which are usable in the invention include alicyclic dihydroxy compounds represented by the following general formula (II) or (III).

$$HOCH_2-R^1-CH_2OH \quad (II)$$

$$HO-R^2-OH \quad (III)$$

(In formulae (II) and (III), $R^1$ and $R^2$ represent a cycloalkyl group having 4-20 carbon atoms or a cycloalkoxy group having 6-20 carbon atoms.)

Cyclohexanedimethanol, which is an alicyclic dihydroxy compound represented by general formula (II), includes various isomers represented by general formula (II) in which $R^1$ is represented by the following general formula (IIa) (wherein $R^3$ represents either an alkyl group having 1-12 carbon atoms or a hydrogen atom). Specific examples thereof include 1,2-cyclohexanedimethanol, 1,3-cyclohexane-dimethanol, and 1,4-cyclohexanedimethanol.

[Chem. 7]

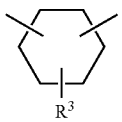

(IIa)

Tricyclodecanedimethanol and pentacyclopentadecanedimethanol, which are alicyclic dihydroxy compounds represented by general formula (II), include various isomers represented by general formula (II) in which $R^1$ is represented by the following general formula (IIb) (wherein n represents 0 or 1).

[Chem. 8]

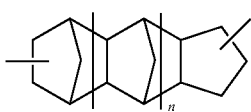

(IIb)

Decalindimethanol or tricyclotetradecanedimethanol, which is an alicyclic dihydroxy compound represented by general formula (II), includes various isomers represented by general formula (II) in which $R^1$ is represented by the following general formula (IIc) (wherein m represents 0 or 1). Specific examples thereof include 2,6-decalindimethanol, 1,5-decalindimethanol, and 2,3-decalindimethanol.

[Chem. 9]

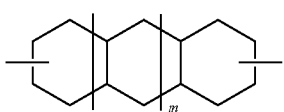

(IIc)

Norbornanedimethanol, which is an alicyclic dihydroxy compound represented by general formula (II), includes various isomers represented by general formula (II) wherein $R^1$ is represented by the following general formula (IId). Specific examples thereof include 2,3-norbornanedimethanol and 2,5-norbornanedimethanol.

[Chem. 10]

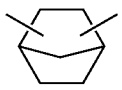

(IId)

Adamantanedimethanol, which is an alicyclic dihydroxy compound represented by general formula (II), includes various isomers represented by general formula (II) in which $R^1$ is represented by the following general formula (IIe). Specific examples thereof include 1,3-adamantanedimethanol.

[Chem. 11]

(IIe)

Meanwhile, cyclohexanediol, which is an alicyclic dihydroxy compound represented by general formula (III), includes various isomers represented by general formula (III) in which $R^2$ is represented by the following general formula (IIIa) (wherein $R^3$ represents either an alkyl group having 1-12 carbon atoms or a hydrogen atom). Specific examples thereof include 1,2-cyclohexanediol, 1,3-cyclohexanediol, 1,4-cyclohexanediol, and 2-methyl-1,4-cyclohexanediol.

[Chem. 12]

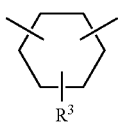

(IIIa)

Tricyclodecanediol and pentacyclopentadecanediol, which are alicyclic dihydroxy compounds represented by general formula (III), include various isomers represented by general formula (III) in which $R^2$ is represented by the following general formula (IIIb) (wherein n represents 0 or 1).

[Chem. 13]

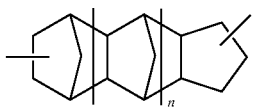

(IIIb)

Decalindiol or tricyclotetradecanediol, which is an alicyclic dihydroxy compound represented by general formula (III), includes various isomers represented by general formula (III) in which $R^2$ is represented by the following general formula (IIIc) (wherein m represents 0 or 1). Specific examples thereof include 2,6-decalindiol, 1,5-decalindiol, and 2,3-decalindiol.

[Chem. 14]

(IIIc)

Norbornanediol, which is an alicyclic dihydroxy compound represented by general formula (III), includes various isomers represented by general formula (III) in which $R^2$ is represented by the following general formula (IIId). Specific examples thereof include 2,3-norbornanediol and 2,5-norbornanediol.

[Chem. 15]

(IIId)

Adamantanediol, which is an alicyclic dihydroxy compound represented by general formula (III), includes various isomers represented by general formula (III) in which $R^2$ is represented by the following general formula (IIIe). Specific examples thereof include 1,3-adamantanediol.

[Chem. 16]

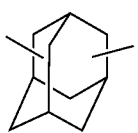

(IIIe)

Especially preferred of the examples of alicyclic dihydroxy compounds described above are cyclohexanedimethanols, tricyclodecanedimethanols, adamantanediols, and pentacyclopentadecanedimethanols. Preferred from the standpoints of availability and handleability are 1,4-cyclohexanedimethanaol, 1,3-cyclohexane-dimethanol, 1,2-cyclohexanedimethanol, and tricyclodecanedimethanol.

Examples of the aliphatic dihydroxy compounds usable in the invention include ethylene glycol, 1,3-propanediol, 1,2-propanediol, 1,4-butanediol, 1,3-butanediol, 1,2-butanediol, 1,5-heptanediol, and 1,6-hexanediol.

Examples of the oxyalkylene glycols usable in the invention include diethylene glycol, triethylene glycol, tetraethylene glycol, and polyethylene glycol.

Examples of the aromatic dihydroxy compounds usable in the invention include 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy(3,5-diphenyl)phenyl)propane, 2,2-bis(4-hydroxy-3,5-dibromophenyl)propane, 2,2-bis(4-hydroxyphenyl)pentane, 2,4'-dihydroxydiphenylmethane, bis(4-hydroxy-phenyl)methane, bis(4-hydroxy-5-nitrophenyl)methane, 1,1-bis(4-hydroxyphenyl)-ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis(4-hydroxyphenyl) sulfide, 4,4'-dihydroxydiphenyl ether, 4,4'-dihydroxy-3,3'-dichlorodiphenyl ether, 4,4'-dihyroxy-2,5-diethoxydiphenyl ether, 9,9-bis[4-(2-hydroxyethoxy)phenyl]-fluorene, 9,9-bis[4-(2-hydroxyethoxy-2-methyl)phenyl]fluorene, 9,9-bis(4-hydroxy-phenyl)fluorene, and 9,9-bis(4-hydroxy-2-methylphenyl)fluorene.

Examples of the diols having a cyclic ether structure which are usable in the invention include the spiro-glycol represented by formula (2) given above and dioxane glycol.

The compounds shown above are mere examples of the alicyclic dihydroxy compounds, aliphatic dihydroxy compounds, oxyalkylene glycols, aromatic dihydroxy compounds, and diols having a cyclic ether structure which are usable in the invention. The dihydroxy compounds usable in the invention should not be construed as being limited to those examples in any way. One of those compounds or two or more thereof can be used together with a dihydroxy compound represented by general formula (1). Hereinafter, those dihydroxy compounds are sometimes referred to as "other dihydroxy compounds".

Use of such other dihydroxy compounds can produce the effect of improving flexibility, improving heat resistance, or improving moldability, etc. according to applications. The proportion of a dihydroxy compound (I), for example, a dihydroxy compound represented by general formula (1), to all dihydroxy compounds constituting the polycarbonate of the invention is not particularly limited. However, the proportion thereof is preferably 10% by mole or higher, more preferably 40% by mole or higher, even more preferably 60% by mole or higher, and is preferably 90% by mole or lower, more preferably 80% by mole or lower. Too high contents of constituent units derived from the other dihydroxy compounds may result in the cases where the inherent optical properties are impaired.

In the case where an alicyclic dihydroxy compound among the other dihydroxy compounds is used, the total proportion of a dihydroxy compound (I), for example, a dihydroxy compound represented by general formula (1), and the alicyclic dihydroxy compound to all dihydroxy compounds constituting the polycarbonate is not particularly limited. However, the total proportion thereof is preferably 80% by mole or higher, more preferably 90% by mole or higher, especially preferably 95% by mole or higher.

In the polycarbonate of the invention, the proportion of the content of constituent units derived from the dihydroxy compound (I), for example, a dihydroxy compound represented by general formula (1), to the content of constituent units derived from the alicyclic dihydroxy compound can be selected at will. However, it is preferred that [constituent units derived from the dihydroxy compound represented by general formula (1)]:[constituent units derived from the alicyclic dihydroxy compound] should be from 1:99 to 99:1 (% by mole). It is especially preferred that [constituent units derived from the dihydroxy compound represented by general formula (1)]:[constituent units derived from the alicyclic dihydroxy compound] should be from 10:90 to 90:10 (% by mole). In the case where the amount of constituent units derived from the dihydroxy compound represented by general formula (1) is larger than that range and where the amount of constituent units derived from the alicyclic dihydroxy compound is smaller than that range, the polycarbonate is apt to be colored. Conversely, in the case where the amount of constituent units derived from the dihydroxy compound represented by general formula (1) is smaller than the lower limit and the amount of constituent units derived from the alicyclic dihydroxy compound is larger than the upper limit, the polycarbonate tends to have an insufficient molecular weight.

When an aliphatic dihydroxy compound, an oxyalkylene glycol, an aromatic dihydroxy compound, and a diol having a cyclic ether structure are used, then the total proportion of a dihydroxy compound (I), for example, a dihydroxy compound represented by general formula (1), and those dihydroxy compounds to all dihydroxy compounds constituting the polycarbonate is not particularly limited, and can be selected at will. Furthermore, the proportion of the content of constituent units derived from the dihydroxy compound (I), for example, a dihydroxy compound represented by general formula (1), to the content of constituent units derived from those dihydroxy compounds is also not particularly limited, and can be selected at will.

The degree of polymerization of the polycarbonate of the invention which has constituent units derived from those dihydroxy compounds (hereinafter, this polycarbonate is sometimes referred to as "polycarbonate copolymer") is preferably 0.40 dL/g or higher, more preferably 0.42 dL/g or higher, even more preferably 0.45 dL/g or higher, in terms of reduced viscosity determined by using a mixed solvent composed of phenol and 1,1,2,2-tetrachloroethane in a weight ratio of 1:1 as a solvent to precisely regulated a polycarbonate concentration to 1.00 g/dL and measuring the viscosity of the solution at a temperature of 30.0° C.±0.1° C. (hereinafter referred to simply as "reduced viscosity of polycarbonate"). It is preferred that the degree of polymerization thereof should be generally 2.0 dL/g or lower, preferably 1.60 dL/g or lower. Polycarbonates having an exceedingly low reduced viscosity have poor mechanical strength after having being molded into lenses, etc. Polycarbonates having too high a reduced viscosity tend to have reduced flowability during molding to reduce cycle characteristics, resulting in a prolonged molding cycle. In addition, there is a tendency that the molded article obtained is apt to have an increased birefringence.

The polycarbonate of the invention has an Abbe number of preferably 50 or larger, especially preferably 55 or larger. The larger the value thereof, the smaller the wavelength-dependent dispersion of refractive indexes. For example, when the polycarbonate is used as a single lens, the chromatic aberration thereof decreases with increasing Abbe number, making it easy to obtain clearer images. The smaller the Abbe number, the larger the wavelength-dependent dispersion of refractive indexes. When the polycarbonate is used as a single lens, the chromatic aberration thereof increases with decreasing Abbe number, resulting in enhanced image blurring. Consequently, the larger the value of Abbe number, the more the polycarbonate is preferred. There is no particular upper limit on the Abbe number.

The polycarbonate of the invention has a 5% weight loss temperature of preferably 340° C. or higher, more preferably 345° C. or higher. The higher the 5% weight loss temperature, the higher the thermal stability and the higher the temperature at which the polycarbonate can be used. In addition, the polycarbonate having a high 5% weight loss temperature can be produced at an elevated temperature, and the allowance of control for production can be widened. Such a polycarbonate is therefore easy to produce. The lower the 5% weight loss temperature, the lower the thermal stability and the more the polycarbonate is difficult to use at high temperatures. In addition, the allowance of control for production becomes narrow, making the production difficult. Consequently, there is no particular upper limit on the 5% weight loss temperature. The higher the 5% weight loss temperature, the better. The decomposition temperature of the copolymer is an upper limit.

The polycarbonate of the invention has a photoelastic coefficient which is preferably $-20\times10^{-12}$ $Pa^{-1}$ or higher, more preferably $-10\times10^{-12}$ $Pa^{-1}$ or higher, and is preferably $40\times10^{-12}$ $Pa^{-1}$ or lower, more preferably $20\times10^{-12}$ $Pa^{-1}$ or lower. In the case of producing an optical film, for example, a high photoelastic coefficient results in a large value of the phase retardation of the film formed by melt extrusion, solution casting, etc. When this film is stretched, slight changes in tension result in further increased fluctuations in the in-plane phase retardation of the film. Furthermore, when such a retardation film is applied, not only a shifting from the desired phase retardation occurs due to tension for the application, but also the value of phase retardation is apt to change due to the contraction, etc. of the polarizing plate obtained by the application. The lower the photoelastic coefficient, the smaller the fluctuations in phase retardation.

The polycarbonate of the invention has an Izod impact strength of preferably 30 $J/m^2$ or higher. The higher the Izod impact strength thereof, the higher the strength of the molded article and the less the molded article is apt to break. There is hence no particular upper limit.

It is preferred that the polycarbonate of the invention should satisfy the following: the amount of any gas, other than phenol ingredients, which generates per unit area from the polycarbonate at 110° C. (hereinafter sometimes referred to simply as "gas generation amount") is 5 $ng/cm^2$ or smaller. It is more preferred that the gas generation amount regarding gases derived from the dihydroxy compounds other than the dihydroxy compound represented by general formula (1) should be 0.5 $ng/cm^2$ or smaller. The smaller the gas generation amount, the more the polycarbonate is usable in applications where influences of generated gases should be avoided, such as, for example, applications in which electronic parts, e.g., semiconductors, are stored, applications concerning interior materials for buildings, and housings of domestic electrical products, etc.

Specific methods for determining the Abbe number, 5% weight loss temperature, photoelastic coefficient, Izod impact strength, and gas generation amount of the polycarbonate of the invention are as shown in Examples, which will be described later.

When examined by differential scanning calorimetry (DSC), the polycarbonate of the invention shows a single glass transition temperature. By regulating the kinds and proportions of the dihydroxy compound represented by general formula (1) and the alicyclic dihydroxy compound, the glass transition temperature of the polycarbonate can be changed. Thus, the polycarbonate can be obtained as a polymer which has any desired glass transition temperature in the range of, for example, from about 45° C. to about 155° C. according to applications.

For example, for film applications where flexibility is necessary, it is preferred to regulate the glass transition temperature of the polycarbonate to 45° C. or higher, e.g., 45-100° C. For applications as molded articles required to have some degree of heat resistance, such as bottles and packages, it is preferred to regulate the glass transition temperature of the polycarbonate to 90° C. or higher, e.g., 90-130° C. When the polycarbonate has a glass transition temperature of 120° C. or higher, this polycarbonate is suitable for lens applications. Namely, the polycarbonate having such a glass transition temperature is less apt to deform even in a high-temperature high-humidity environment such as, e.g., one having a temperature of 85° C. and a relative humidity of 85%, and is reduced in fluctuations of lens surface accuracy. That glass transition temperature is therefore preferred.

The polycarbonate of the invention preferably is one which simultaneously has two or more of those properties, for example, one having an Abbe number of 50 or larger and a 5% weight loss temperature of 340° C. or higher. More preferred is one which further has other properties.

The polycarbonate of the invention can be produced by a melt polymerization method in which one or more dihydroxy compounds including the dihydroxy compound (I) are reacted with a carbonic acid diester in the presence of a polymerization catalyst.

Examples of the carbonic acid diester to be used in the melt polymerization method generally include carbonic acid diesters represented by the following general formula (3).

[Chem. 17]

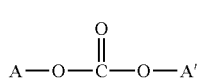

(3)

[In general formula (3), A and A' represent an aliphatic group which has 1-18 carbon atoms and may have a substituent or an aromatic group which may have a substituent; and A and A' may be the same or different.]

Examples of the carbonic acid diesters represented by general formula (3) include diphenyl carbonate, substituted diphenyl carbonates represented by ditolyl carbonate, dimethyl carbonate, diethyl carbonate, and di-t-butyl carbonate. Especially preferred examples thereof include diphenyl carbonate and substituted diphenyl carbonates. One of these carbonic acid diesters may be used alone, or a mixture of two or more thereof may be used.

It is preferred that the carbonic acid diester should be used in such an amount that the molar proportion thereof to all dihydroxy compounds to be subjected to the reaction is from 0.90 to 1.10. The molar proportion thereof is more preferably from 0.96 to 1.04. In the case where the molar proportion thereof is smaller than 0.90, the polycarbonate produced has an increased amount of terminal OH groups to have impaired thermal stability, or a polymer having a desired high molecular weight cannot be obtained. In the case where the molar proportion thereof is larger than 1.10, the rate of the transesterification reaction decreases when the reaction is conducted under the same conditions, or it is difficult to produce a polycarbonate having a desired molecular weight. In addition, the polycarbonate copolymer produced contains a larger amount of the carbonic acid diester remaining therein, and there are even the cases where the residual carbonic acid diester causes an odor during molding or makes the molded article odorous.

The proportions of the dihydroxy compound represented by general formula (1) to be used and other dihydroxy compounds to be used are the same as the above-described proportions of constituent units derived from the respective dihydroxy compounds constituting the polycarbonate of the invention.

As the polymerization catalyst (transesterification catalyst) in the melt polymerization, use may be made of an alkali metal compound and/or an alkaline earth metal compound. It is possible to use a basic compound, such as, e.g., a basic boron compound, basic phosphorus compound, basic ammonium compound, or amine compound, as an auxiliary ingredient together with the alkali metal compound and/or alkaline earth metal compound. It is, however, especially preferred that an alkali metal compound and/or an alkaline earth metal compound should be used alone.

Examples of the alkali metal compound usable as the polymerization catalyst include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, phenylated sodium boride, phenylated potassium boride, phenylated lithium boride, phenylated cesium boride, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenylphosphate, dipotassium phenylphosphate, dilithium phenylphosphate, dicesium phenylphosphate, alcoholates or phenolates of sodium, potassium, lithium, and cesium, and the disodium salt, dipotassium salt, dilithium salt, and dicesium salt of bisphenol A.

Examples of the alkaline earth metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. In this description, the terms "alkali metal" and "alkaline earth metal" are used so as to have the same meanings respectively as "Group-1 metal" and "Group-2 metal" according to the long form of the periodic table (Nomenclature of Inorganic Chemistry IUPAC Recommendations 2005).

One of these alkali metal compounds and/or alkaline earth metal compounds may be used alone, or two or more thereof may be used in combination.

Examples of the basic boron compound usable in combination with the alkali metal compound and/or alkaline earth metal compound include the sodium salts, potassium salts, lithium salts, calcium salts, barium salts, magnesium salts, or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenyl-boron.

Examples of the basic phosphorus compound include triethylphosphine, tri-n-propylphosphine, triisopropylphosphine, tri-n-butylphosphine, triphenylphosphine, tributylphosphine, and quaternary phosphonium salts.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethyl-benzylammonium hydroxide, trimethylphenylammonium hydroxide, triethylmethyl-ammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxy-imidazole, imidazole, 2-mercaptoimidazole, 2-methylimidazole, and aminoquinoline.

With respect to those basic compounds also, one compound may be used alone or two or more compounds may be used in combination.

When an alkali metal compound and/or an alkaline earth metal compound is used as the polymerization catalyst, the amount of the compound(s) to be used is in the range of generally from 0.1 µmol to 25 µmol, preferably from 0.5 µmol to 20 µmol, more preferably from 0.5 µmol to 15 µmol, in terms of the amount of the metal(s) per mole of all dihydroxy compounds to be subjected to the reaction. In the case where the polymerization catalyst is used in too small an amount, polymerization activity necessary for producing a polycarbonate having a desired molecular weight is not obtained. On the other hand, in the case where the polymerization catalyst is used in too large an amount, the resultant polycarbonate has an impaired hue, or by-products generate to reduce flowability or result in enhanced gel generation, making it difficult to produce a polycarbonate of target quality.

In the invention, the dihydroxy compound (I), for example, a dihydroxy compound represented by general formula (1), may be fed as a solid or may be heated and fed in a molten state. Alternatively, the dihydroxy compound (I) may be fed as an aqueous solution.

On the other hand, an alicyclic dihydroxy compound or another dihydroxy compound also may be fed as a solid or may be heated and fed in a molten state. When the compound is soluble in water, it may be fed as an aqueous solution.

The feeding of these starting-material dihydroxy compounds in a molten state or as an aqueous solution has an advantage that metering and transportation are easy in industrial production.

In the invention, the process in which the dihydroxy compound (I), for example, a dihydroxy compound represented by general formula (1), an alicyclic dihydroxy compound, and other dihydroxy compounds which are used according to need are reacted with a carbonic acid diester in the presence of a polymerization catalyst is generally conducted as a multi-stage process including two or more stages. Specifically, the first-stage reaction may be conducted at a temperature of 140-220° C., preferably 150-200° C., for a period of 0.1-10 hours, preferably 0.5-3 hours. In the second and succeeding stages, the reaction temperature is elevated while gradually lowering the pressure of the reaction system from the first-stage pressure. Simultaneously therewith, the phenol which generates is continuously removed from the reaction system. Finally, polycondensation reaction is conducted at a reaction system pressure of 200 Pa or lower and a temperature in the range of 210-280° C.

For the pressure reduction in this polycondensation reaction, it is important to regulate a balance between temperature and the internal pressure of the reaction system. In particular, when either temperature or pressure is changed earlier than the other, there are the cases where an unreacted monomer is distilled off to shift the dihydroxy compound/carbonic acid diester molar ratio, resulting in a reduced degree of polymerization. For example, in the case where isosorbide and 1,4-cyclohexanedimethanol are used as dihydroxy compounds, the 1,4-cyclohexanedimethanol in the monomeric state is apt to be distilled off when the molar proportion of the 1,4-cyclohexenedimethanol to all dihydroxy compounds is 50% by mole or higher. In this case, the polymerization may be conducted in the following manner. While the internal pressure of the reaction system is kept at a reduced pressure of about 13 kPa, the reactants are reacted while elevating the temperature at a rate of 40° C./hr or lower. Thereafter, while the pressure is being reduced to about 6.67 kPa, the temperature is elevated at a rate of 40° C./hr or lower. Finally, polycondensation reaction is conducted at a pressure of 200 Pa or lower and at a temperature of 200° C.-250° C. This method is preferred because a polycarbonate having a sufficiently increased degree of polymerization is obtained.

Meanwhile, when the molar proportion of 1,4-cyclohexanedimethanol, for example, to all dihydroxy compounds is lower than 50% by mole, in particular, when the molar proportion thereof is 30% by mole or lower, an abrupt viscosity increase occurs as compared with the case where the molar proportion of 1,4-cyclohexenedimethanol is 50% by mole or higher. In this case, the following method may, for example, be used. The reactants are reacted while elevating the temperature at a rate of 40° C./hr or lower until the internal pressure of the reaction system is reduced to about 13 kPa. Thereafter, the reactants are reacted while elevating the temperature at a rate of 40° C./hr or higher, preferably at a rate of 50° C./hr or higher, until the pressure is reduced to about 6.67 kPa. Finally, polycondensation reaction is conducted at a reduced pressure of 200 Pa or lower and at a temperature of 220° C.-290° C. This method is preferred because a polycarbonate having a sufficiently increased degree of polymerization is obtained.

The type of reaction operation may be any of a batch type, a continuous type, and a combination of batch and continuous types.

When a polycarbonate is produced by a melt polymerization method in a process of the invention, a phosphoric acid compound, a phosphorous acid compound, or a metal salt of either can be added during the polymerization for the purpose of preventing coloration.

Suitable for use as the phosphoric acid compound is one or more of trialkyl phosphates such as trimethyl phosphate and triethyl phosphate. These compounds may be added in an amount of preferably from 0.0001% by mole to 0.005% by mole, more preferably from 0.0003% by mole to 0.003% by mole, based on all dihydroxy compounds to be subjected to the reaction. In the case where such phosphoric acid compounds are added in an amount smaller than the lower limit, the effect of preventing coloration is low. In the case where the amount thereof is larger than the upper limit, this is causative of an increase in haze or there are even the cases where the phosphoric acid compounds enhance, rather than reduce, coloration or reduce heat resistance.

In the case where a phosphorous acid compound is added, any of the heat stabilizers shown below can be selected at will and used. In particular, one or more of the following are suitable: trimethyl phosphite, triethyl phosphite, tris-nonylphenyl phosphite, tris(2,4-di-tert-butylphenyl)phosphite, and bis(2,4-di-tert-butylphenyl)pentaerythritol diphosphite. These phosphorous acid compounds may be added in an amount of preferably from 0.0001% by mole to 0.005% by mole, more preferably from 0.0003% by mole to 0.003% by mole, based on all dihydroxy compounds to be subjected to the reaction. In the case where such phosphorous acid compounds are added in an amount smaller than the lower limit, the effect of preventing coloration is low. In the case where the amount thereof is larger than the upper limit, this is causative of an increase in haze or there are even the cases where the phosphorous acid compounds enhance, rather than reduce, coloration or reduce heat resistance.

Either a phosphoric acid compound and a phosphorous acid compound or metal salts of these can be added in combination. In this case, the amount of these compounds to be added, in terms of the total amount of the phosphoric acid compound and phosphorous acid compound or of the metal salts of these, is preferably from 0.0001% by mole to 0.005% by mole, more preferably from 0.0003% by mole to 0.003% by mole, based on all dihydroxy compounds, as stated above. In the case where those compounds are added in an amount smaller than the lower limit, the effect of preventing coloration is low. In the case where the amount thereof is larger than the upper limit, this is causative of an increase in haze or there are even the cases where those compounds enhance, rather than reduce, coloration or reduce heat resistance.

The metal salts of a phosphoric acid compound and phosphorous acid compound preferably are alkali metal salts and zinc salts thereof. Especially preferred are zinc salts. Preferred of the zinc salts of phosphoric acid are the zinc salts of long-chain alkyl phosphates.

A heat stabilizer can be incorporated into the polycarbonate thus produced, for the purpose of preventing the molecular weight or hue thereof from decreasing or deteriorating during molding, etc.

Examples of the heat stabilizer include phosphorous acid, phosphoric acid, phosphonous acids, phosphonic acids, and esters thereof. Specific examples thereof include triphenyl phosphite, tris(nonylphenyl) phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl) octyl phosphite, bis(nonylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenyl mono-o-xenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. Preferred of these are trisnonylphenyl phosphite, trimethyl phosphate, tris(2,4-di-tert-butylphenyl) phosphite, bis(2,4-di-tert-butyl-phenyl)pentaerythritol diphosphite, bis(2,6-di-tert-butyl-4-methylphenyl)pentaerythritol diphosphite, and dimethyl benzenephosphonate.

One of these heat stabilizers may be used alone, or two or more thereof may be used in combination.

Such a heat stabilizer may be additionally incorporated in addition to the amount added during the melt polymerization. Namely, after an appropriate amount of a phosphorous acid compound or phosphoric acid compound was added to obtain a polycarbonate, a phosphorous acid compound may be further added by the addition method which will be described later. As a result, the heat stabilizer can be incorporated in a larger amount while preventing a haze increase or coloration from occurring during polymerization and while avoiding a decrease in heat resistance. Consequently, hue deterioration can be prevented.

The amount of those heat stabilizers to be incorporated is preferably 0.0001-1 part by weight, more preferably 0.0005-0.5 parts by weight, even more preferably 0.001-0.2 parts by weight, per 100 parts by weight of the polycarbonate.

A generally known antioxidant may be incorporated into the polycarbonate of the invention for the purpose of preventing oxidation.

Examples of the antioxidant include one or more of pentaerythritol tetrakis(3-mercaptopropionate), pentaerythritol tetrakis(3-laurylthiopropionate), glycerol 3-stearylthiopropionate, triethylene glycol bis[3-(3-tert-butyl-5-methyl-4-hydroxy-phenyl)propionate], 1,6-hexanediol bis[3-(3,5-di-tert-butyl-4-hydroxyphenyl)-propionate], pentaerythritol tetrakis [3-(3,5-di-tert-butyl-4-hydroxyphenyl)propionate], octadecyl 3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamide), 3,5-di-tert-butyl-4-hydroxybenzylphosphonate diethyl ester, tris(3,5-di-tert-butyl-4-hydroxybenzyl) isocyanurate, tetrakis(2,4-di-tert-butylphenyl) 4,4'-biphenylenediphosphinate, 3,9-bis{1,1-dimethyl-2-[β-(3-tert-butyl-4-hydroxy-5-methylphenyl) propionyloxy]ethyl}-2,4,8,10-tetraoxaspiro(5,5)undecane, and the like.

One of these antioxidants may be used alone, or two or more thereof may be used in combination.

The amount of those antioxidants to be incorporated is preferably 0.0001-0.5 parts by weight per 100 parts by weight of the polycarbonate.

A release agent can be incorporated into the polycarbonate of the invention in order to further improve mold releasability for melt molding, so long as the incorporation thereof does not defeat the objects of the invention.

Examples of the release agent include higher-fatty-acid esters of mono- or polyhydric alcohols, higher fatty acids, paraffin waxes, beeswax, olefin waxes, olefin waxes containing a carboxy group and/or carboxylic acid anhydride group, silicone oils, and organopolysiloxanes.

The higher-fatty-acid esters preferably are partial or complete esters of a mono- or polyhydric alcohol having 1-20 carbon atoms with a saturated fatty acid having 10-30 carbon atoms. Examples of the partial or complete esters of a mono- or polyhydric alcohol with a saturated fatty acid include stearic acid monoglyceride, stearic acid diglyceride, stearic acid triglyceride, stearic acid monosorbitate, stearyl stearate, behenic acid monoglyceride, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, and 2-ethylhexyl stearate.

Preferred of these are stearic acid monoglyceride, stearic acid triglyceride, pentaerythritol tetrastearate, and behenyl behenate.

The higher fatty acids preferably are saturated fatty acids having 10-30 carbon atoms. Examples of these fatty acids include myristic acid, lauric acid, palmitic acid, stearic acid, and behenic acid.

One of those release agents may be used alone, or two or more thereof may be used in combination.

The amount of such release agents to be incorporated is preferably 0.01-5 parts by weight per 100 parts by weight of the polycarbonate.

A light stabilizer can be incorporated into the polycarbonate of the invention so long as the incorporation thereof does not defeat the objects of the invention.

Examples of the light stabilizer include 2-(2'-hydroxy-5'-tert-octylphenyl)benzotriazole, 2-(3-tert-butyl-5-methyl-2-hydroxyphenyl)-5-chlorobenzo-triazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis(4-cumyl-6-benzo-triazolephenyl), and 2,2'-p-phenylenebis(1,3-benzoxazin-4-one).

One of these light stabilizers may be used alone, or two or more thereof may be used in combination.

The amount of such light stabilizers to be incorporated is preferably 0.01-2 parts by weight per 100 parts by weight of the polycarbonate.

A bluing agent can be incorporated into the polycarbonate of the invention in order to eliminate the yellowness of lenses which is attributable to the polymer or an ultraviolet absorber. Any bluing agent for use in polycarbonate resins can be used without arousing any particular trouble. In general, anthraquinone dyes are easily available and preferred.

Specific examples of the bluing agents include the following typical examples: common name Solvent Violet 13 [CA. No. (color index No.) 60725], common name Solvent Violet 31 [CA. No. 68210], common name Solvent Violet 33 [CA. No. 60725], common name Solvent Blue 94 [CA. No. 61500], common name Solvent Violet 36 [CA. No. 68210], common name Solvent Blue 97 ["Macrolex Violet RR", manufactured by Bayer AG], and common name Solvent Blue 45 [CA. No. 61110].

One of these bluing agents may be used alone, or two or more thereof may be used in combination.

Those bluing agents may be incorporated in a proportion of from $0.1 \times 10^{-4}$ to $2 \times 10^{-4}$ parts by weight per 100 parts by weight of the polycarbonate.

For incorporating various additives such as those described above into the polycarbonate of the invention, use may be made, for example, of: a method in which the ingredients are mixed by means of a tumbling mixer, twin-cylinder mixer, supermixer, Nauta mixer, Banbury mixer, kneading rolls, extruder, or the like; or a solution blending method in which the ingredients are dissolved in a common good solvent such as, e.g., methylene chloride and mixed together in the solution state. However, methods for incorporating additives are not particularly limited, and any of the polymer blending techniques in ordinary use may be employed.

The polycarbonate thus obtained or a polycarbonate composition obtained by incorporating various additives and another resin thereinto can be molded into various molded articles by a generally known technique such as, e.g., injection molding, extrusion molding, or compression molding, either directly or after having been temporarily formed into pellets with a melt extruder. Examples of the molded articles include films, sheets, bottles, and containers; lenses such as camera lenses, finder lenses, and lenses for CCDs and CMOSs; optical films such as retardation films, diffusion sheets, and polarization films for liquid-crystal or plasma displays; and other optical materials or optical parts for optical disks, optical waveguides, etc.

From the standpoint of enhancing the compatibility of the polycarbonate to obtain stable releasability and stable properties, it is preferred to use a single-screw extruder or a twin-screw extruder in the melt extrusion. The technique employing a single-screw extruder or a twin-screw extruder does not necessitate use of a solvent or the like and is reduced in environmental burden. That technique can be advantageously used also from the standpoint of productivity.

Melt kneading temperature for the extruder depends on the glass transition temperature of the polycarbonate. When the glass transition temperature of the polycarbonate is lower than 90° C., the melt kneading temperature for the extruder is generally 130° C.-250° C., preferably 150° C.-240° C. In the case where the melt kneading temperature is lower than 130° C., the polycarbonate melt has an increased viscosity to impose an increased load on the extruder, resulting in reduced productivity. In the case where the temperature is higher than 250° C., the polycarbonate melt has a reduced viscosity to make pellet formation difficult, resulting in reduced productivity.

When the glass transition temperature of the polycarbonate is 90° C. or higher, the melt kneading temperature for the extruder is generally 200° C.-300° C., preferably 220° C.-260° C. In the case where the melt kneading temperature is lower than 200° C., the polycarbonate melt has an increased viscosity to impose an increased load on the extruder, resulting in reduced productivity. In the case where the temperature is higher than 300° C., the polycarbonate is apt to deteriorate. In this case, the polycarbonate yellows or decreases in molecular weight to thereby have impaired strength.

In the case where an extruder is used, it is desirable to dispose a filter in order to prevent polycarbonate scorching and foreign-matter inclusion during extrusion. The size of foreign matter particles capable of being removed by the filter (opening size) is preferably 100 µm or smaller, although the size depends on desired optical accuracy. Especially when it is important to avoid inclusion of foreign matter, the opening size is 40 µm or smaller, preferably 20 µm or smaller. When foreign matter should be further avoided, the opening size is preferably 10 µm or smaller.

It is desirable that extrusion of the polycarbonate should be conducted in a clean room in order to prevent inclusion of foreign matter after the extrusion.

When the polycarbonate extruded is cooled and formed into chips, it is preferred to use a method in which the extrudate is cooled with air, water, etc. It is desirable that air from which foreign matter has been removed beforehand with a high-efficiency particulate air filter or the like should be used for the air cooling in order to prevent the foreign matter present in air from adhering again. In the case of employing water cooling, it is desirable to use water from which metallic ingredients have been removed with, e.g., an ion-exchange resin and foreign matter has been further removed with a filter. Although filters of various sizes (opening sizes) are usable, it is preferred to use a filter having an opening size of from 10 µm to 0.45 µm.

For molding the polycarbonate into a lens, an injection molding machine or an injection-compression molding machine is suitable. Especially important among conditions for this molding are mold surface temperature and resin temperature. Such molding conditions vary depending on the composition and degree of polymerization of the polycarbonate, etc., and cannot be unconditionally specified. However, the mold surface temperature is preferably from 30° C. to 170° C., and the resin temperature in this case is preferably regulated to 220° C. to 290° C. In the case where the mold surface temperature is lower than 30° C., the resin is poor in both flowability and transferability and there is a tendency that a stress strain remains after the injection molding, resulting in enhanced birefringence. In the case where the mold surface temperature is higher than 170° C., the resin is apt to deform upon release from the mold although transferability thereof is satisfactory. In the case where the resin temperature is 290° C. or higher, the resin is susceptible to decomposition and this is causative of reduced strength and coloration of the molded article. In addition, such too high resin temperatures are not economical because a prolonged molding cycle results.

In the case where an optical material or an optical part is molded from the polycarbonate, it is desired that care should be taken not to allow dust particles and the like to come into, in steps including a starting-material charging step, a polymerization step, and a step in which the copolymer obtained is extruded into a cooling medium and formed into pellets or a sheet. The degree of cleanness is usually class 1,000 or lower in the case where the polycarbonate is for use in compact disks, and is class 100 or lower in the case where the polycarbonate is for use in more sophisticated information recording.

Examples of the film for optical use of the invention include film/sheet members represented by ones for liquid-crystal displays, such as retardation films, films for widening viewing angle, polarizer protection films, prism sheets, diffusion sheets, reflection sheets, and films for preventing surface reflection, and release films, protective films, and the like for use in production steps.

Methods for forming the film for optical use of the invention are not particularly limited, and methods which are known per se can be used. Examples thereof include T-die molding, inflation molding, calendering, casting, and hot pressing. Preferred examples include T-die molding, inflation molding, and casting.

For example, in the case of use as a retardation film, the film formed has a thickness of generally from 10 µm to 200 µm, preferably from 30 µm to 150 µm. The film formed has a value of phase retardation of preferably 20 nm or smaller, more preferably 10 nm or smaller. When the value of phase retardation of the film is larger than that, a retardation film obtained by stretching the film tends to have increased fluctuations of the value of in-plane phase retardation.

Meanwhile, with respect to stretching methods also, known techniques for stretching can be used, such as, e.g., uniaxial stretching in which the film is stretched either the machine direction or the transverse direction and biaxial stretching in which the film is stretched in both the machine and transverse directions. It is also possible to subject the film to special biaxial stretching, such as that shown in JP-A-5-157911, to regulate the three-dimensional refractive indexes of the film.

With respect to stretching conditions for producing a retardation film, it is preferred to conduct the stretching at a temperature in the range of from the temperature lower by 20° C. than the glass transition temperature of the film-forming material of the temperature higher by 40° C. than the glass transition temperature. More preferably, the stretching temperature is in the range of the temperature lower by 10° C. than the glass transition temperature of the film-forming material to the temperature higher by 20° C. than the glass transition temperature. In the case where the stretching temperature is lower by more than 20° C. than the glass transition temperature, the stretched film is apt to have enhanced phase retardation. In this case, it is necessary to use a reduced stretch ratio for obtaining a desired value of phase retardation, and this is apt to result in increased fluctuations in in-plane phase retardation. On the other hand, in the case where the stretching temperature is higher by more than 40° C. than the glass transition temperature, the film obtained has reduced phase retardation. In this case, it is necessary to use an increased stretch ratio for obtaining a desired value of phase retardation, resulting in a narrowed range of proper stretching conditions.

The ratio at which the film is stretched is governed by a desired value of phase retardation. In the case of machine-direction uniaxial stretching, however, the stretch ratio is generally 1.05-4, preferably 1.1-3. Although the stretched film may be immediately allowed to cool at room temperature, it is preferred that the stretched film should be held in an atmosphere having a temperature in the range of from the temperature lower by 20° C. than the glass transition temperature to the temperature higher by 40° C. than the glass transition temperature, for a period of at least 10 seconds, preferably 1 minute or longer, more preferably 10 minutes to 60 minutes, to conduct heat setting and be then cooled to room temperature. Thus, a retardation film having stable phase retardation characteristics and wavelength-dependent dispersion characteristics is obtained.

In the case where the retardation film of the invention is used, for example, for color compensation in an STN liquid-crystal display device, a value of phase retardation thereof is generally selected from the range of 400 nm to 2,000 nm.

In the case where the retardation film of the invention is used, for example, as a half-wave plate, a value of phase retardation thereof may be selected from the range of 200 nm to 400 nm.

In the case where the retardation film of the invention is used, for example, as a quarter-wave plate, a value of phase retardation thereof may be selected from the range of 90 nm to 200 nm. A more preferred value of phase retardation for the quarter-wave plate is from 100 nm to 180 nm.

In the case of use as such retardation plates, a single sheet of the retardation film of the invention may be used alone or two or more sheets thereof may be used in combination. It is also possible to use a combination thereof with other film(s), etc.

The retardation film of the invention can be laminated to a known iodine-type or dye-type polarizing plate through a pressure-sensitive adhesive. In the laminating, it is necessary to laminate the retardation film so that the polarization axis of the polarizing plate forms a specific angle with the slow axis of the retardation film according to applications.

The retardation film of the invention may be laminated, for example, as a quarter-wave plate to a polarizing plate, and the resultant laminate can be used as a circular polarizer. In this case, the retardation film is generally laminated so that the polarization axis of the polarizing plate and the slow axis of the retardation film form an angle of substantially 45° with each other.

Furthermore, the retardation film of the invention may be laminated, for example, as a polarizer protection film as a component of a polarizing plate. Moreover, the retardation film of the invention may be used, for example, as a color compensation film for an STN liquid-crystal display device and laminated to a polarizing plate, and the resultant laminate can be used as an elliptical polarizer.

As described above, the film for optical use, for example, the retardation film, of the invention is suitable for use in display devices including liquid-crystal and plasma displays. These display devices can be produced by methods which are known per se.

The polycarbonate can be used also as a polymer alloy obtained by kneading the polycarbonate together with, for example, one or more of synthetic resins of the polycondensation type such as aromatic polycarbonates, aromatic polyesters, aliphatic polyesters, and polyamides, polyolefins such as polyethylene and polypropylene, synthetic resins of the addition polymerization type such as polystyrene and poly(methyl methacrylate), synthetic resins such as amorphous polyolefins, ABSs, and ASs, biodegradable resins such as poly(lactic acid) and poly(butylene succinate), and rubbers. These polymer alloys can be used also as compositions of the copolymer according to the invention.

EXAMPLES

The invention will be explained below in more detail by reference to Examples. However, the invention should not be construed as being limited by the following Examples unless the invention departs from the spirit thereof.

In the following, properties of polycarbonates were evaluated by the following methods.

(1) Refractive Index and Abbe Number

An Abbe refractometer (DR-M4, manufactured by Atago Co., Ltd.) and interference filters for wavelengths of 656 nm (C-line), 589 nm (D-line), 546 nm (e-line), and 486 nm (F-line) were used to measure refractive indexes nC, nD, ne, and nF at the respective wavelengths.

A test sample was obtained by press-molding a resin at 160-200° C. to produce a film having a thickness of from 80 μm to 500 μm and strips having a width of about 8 mm and a length of from 10 mm to 40 mm were cut out of the film to obtain specimens.

A measurement was made at 20° C. using 1-bromonaphthalene as an interfacial liquid.

Abbe number νd was calculated using the following equation.

$$\nu d = (1-nD)/(nC-nF)$$

The larger the Abbe number, the smaller the wavelength dependence of refractive index and the smaller the wavelength-dependent focal shifting, for example, in a single lens.

(2) Glass Transition Temperature (Tig)

About 10 mg of a sample was examined with a differential scanning calorimeter (DSC822, manufactured by Mettler Inc.) while being heated at a heating rate of 10° C./min. In accordance with JIS K 7121 (1987), the lower-temperatureside base line was extended toward the higher-temperature side to draw a straight line, and a tangent was drawn to the point which was located in a stepwise changing section attributable to glass transition and at which the curve had a maximum gradient. The temperature corresponding to the point of intersection of the straight line and the tangent was determined as an extrapolated glass transition initiation temperature.

(3) Color

A color meter (300A, manufactured by Nippon Denshoku Kogyo K.K.) was used to determine the color of chips.

A given amount of chips were placed in a glass cell and examined through a reflectance measurement to determine a value of b.

The smaller the value thereof, the lower the yellowness.

(4) Reduced Viscosity

A Ubbelohde viscometer was used in automatic viscometer Type DT-504, manufactured by Chuo Rika Corp. A 1/1 by weight mixture of phenol and 1,1,2,2-tetrachloroethane was used as a solvent to measure the viscosity at a temperature of 30.0° C.±0.1° C. A solution was precisely prepared so as to have a concentration of 1.00 g/dL.

A sample was dissolved with stirring at 120° C. for 30 minutes, and the resultant solution was subjected to the measurement after cooling.

Relative viscosity ηrel was determined from the flow time for the solvent t0 and the flow time for the solution t using the following equation.

$$\eta rel = t/t0 (g \cdot cm^{-1} \cdot sec^{-1})$$

Specific viscosity ηsp was determined from the relative viscosity ηrel using the following equation.

$$\eta sp = (\eta - \eta 0)/\eta 0 = \eta rel - 1$$

The specific viscosity ηsp was divided by the concentration c (g/dL) to determine the reduced viscosity ηred using the following equation.

$$\eta red = \eta sp/c$$

The larger the value thereof, the higher the molecular weight.

(5) 5% Weight Loss Temperature

TG-DTA (SSC-5200, TG/DTA220), manufactured by Seiko Instruments & Electronics Ltd., was used. Ten milligrams of a sample was placed in an aluminum vessel and examined in a nitrogen atmosphere (nitrogen flow rate, 200 mL/min) while elevating the temperature from 30° C. to 450° C. at a heating rate of 10° C./min. The temperature at which the weight had decreased by 5% was determined.

The higher the temperature, the less the polymer is susceptible to pyrolysis.

(6) Izod Impact Strength

Injection molding machine Mini Max CS-183MMX, manufactured by Custom Scientific Inc., was used to injection-mold test pieces having a length of 31.5 mm, width of 6.2 mm, and thickness of 3.2 mm, at a temperature of 240-300° C. A notch having a depth of 1.2 mm was formed therein with a notching machine to obtain specimens.

The specimens were examined with Izod impact tester Mini Max Type CS-183TI, manufactured by Custom Scientific Inc., to determined a notched Izod impact strength at 23° C.

The larger the value thereof, the higher the impact strength and the less the molded article is apt to break.

(7) Tensile Test

Tensile test pieces having a parallel-part length of 9 mm and a parallel-part diameter of 1.5 mm were injection-molded with the injection molding machine at a temperature of 240° C.-300° C. Tensile tester Type CS-183TE, manufactured by Custom Scientific Inc., was used to conduct a tensile test under the conditions of a pulling rate of 1 cm/min to determine an elongation at yield, tensile strength at yield, tensile modulus at yield, and elongation at break.

The larger the value of each property, the higher the strength or elongation.

(8) NMR

Heavy chloroform was used as a solvent to conduct $^1$H-NMR analysis with Unity Inova, manufactured by Varian Inc., under the conditions of a resonance frequency of 500 MHz, flip angle of 45°, and examination temperature of 25° C.

(9) Photoelastic Coefficient

<Sample Production>

A 4.0-g portion of a polycarbonate resin sample which had been vacuum-dried at 80° C. for 5 hours was pressed for 1 minute with a hot press at a hot-press temperature of 200-250° C. under the conditions of a preheating period of 1-3 minutes and a pressure of 20 MPa using a spacer having a width of 8 cm, length of 8 cm, and thickness of 0.5 mm. Thereafter, the resin was taken out together with the spacer and pressed/cooled with a water-pipe-cooled press at a pressure of 20 MPa for 3 minutes to produce a sheet. A sample having a width of 5 mm and a length of 20 mm was cut out of the sheet.

<Measurement>

The sample was examined using an apparatus configured by combining a birefringence analyzer including a He—Ne laser, polarizer, compensator, analyzer, and light detector with a vibration-type viscoelastometer (DVE-3, manufactured by Rheology Co., Ltd.). (For details, refer to *Journal of the Society of Rheology, Japan*, Vol. 19, pp. 93-97 (1991).)

The sample cut out was fixed to the viscoelastometer and examined for storage modulus E' at room temperature of 25° C. and a frequency of 96 Hz. Simultaneously therewith, the laser light emitted was passed through the polarizer, sample, compensator, and analyzer in this order and picked up with the light detector (photodiode), and the signals were passed through a lock-in amplifier. With respect to waveform at an angular frequency of ω or 2ω, the amplitude and the phase difference caused by the strain were determined to determine a strain-optical coefficient O'. For this operation, the direction of the polarizer and that of the analyzer were regulated so as to be perpendicular to each other and each form an angle of π/4 with the stretching direction of the sample.

A photoelastic coefficient C was determined from the storage modulus E' and the strain-optical coefficient O' using the following equation.

$$C = O'/E'$$

(10) Gas Generation Amount

<Sample Production>

Eight grams of a polycarbonate resin sample which had been vacuum-dried at 100° C. for 5 hours was pressed for 1 minute with a hot press at a hot-press temperature of 200-250° C. under the conditions of a preheating period of 1-3 minutes and a pressure of 20 MPa using a spacer having a width of 8 cm, length of 8 cm, and thickness of 0.5 mm. Thereafter, the resin was taken out together with the spacer and pressed/cooled with a water-pipe-cooled press at a pressure of 20 MPa for 3 minutes to produce a sheet. A sample having a width of 1 cm and a length of 2 cm was cut out of the sheet. The sample had a thickness of 1 mm.

<Measurement>

The amount of gases generated was determined by thermal desorption-gas chromatography/mass spectrometry (TDS- GC/MS). TDS2, manufactured by GERSTEL, was used as a measuring apparatus, and an examination was made under the conditions of a thermal-desorption temperature of 250° C., period of 10 minutes, and trap temperature of −130° C.

A sample was placed in a glass chamber and held at 110° C. for 30 minutes at a helium flow rate of 60 mL/min, and the gases which generated were collected with collection tube Tenax-TA.

HP6890/5973N, manufactured by Agilent Inc., was used as a GC/MS, and HP-VOC (0.32×60 m; 1.8 μm df) was used as a column. The collection tube was held at 40° C. for 5 minutes, subsequently heated to 280° C. at 8° C./min, and then held at 280° C. for 25 minutes to examine the gases. Helium was passed as a carrier gas at 1.3 mL/min.

The gas generation amount determined was the total amount of generated gases, other than phenol, which had been distilled off during production, and than benzaldehyde, which was derived from phenol, per unit area and was expressed in terms of toluene amount.

(11) Pencil Hardness

Surface measuring device TRIBOGEAR Type 14DR, manufactured by Shinto Scientific Co., Ltd., was used as a measuring apparatus, and a measurement was made in accordance with JIS K 5600 under the following conditions.

Load: 750 g
Measuring speed: 30 mm/min
Measuring distance: 7 mm

As pencils, use was made of UNI, manufactured by Mitsubishi Pencil Co., Ltd.

The pencils used had hardnesses of 4H, 3H, 2H, H, F, HB, B, 2B, 3B, and 4B.

A specimen was tested five times, and the hardness softer by one rank than the hardness of the pencil which marred the specimen two or more times was taken as the pencil hardness of the specimen.

(12) Determination of Formic Acid

The amount of formic acid contained in isosorbide was determined with an ion chromatograph in the following manner.

About 0.5 g of isosorbide was precisely weighed out and placed in a 50-mL measuring flask, and pure water was added thereto to adjust the volume of the resultant solution. An aqueous solution of sodium formate was used as a reference. The peak having the same retention time as the peak of the reference was regarded as assignable to formic acid, and the amount of formic acid was determined from the area of the peak by the absolute calibration curve method.

The ion chromatograph used was Type DX-500, manufactured by Dionex Corp., and a conductometric detector was used as a detector. As measuring columns, use was made of AG-15 and AS-15, both manufactured by Dionex Corp., as a guard column and a separation column, respectively. A test sample was injected into a 100-μL sample loop, and 10-mM NaOH was used as an eluent to examine the sample at a flow rate of 1.2 mL/min and a thermostatic-chamber temperature of 35° C. As a suppressor was used a membrane suppressor. As a regenerant solution was used a 12.5-mM aqueous solution of $H_2SO_4$.

(13) Determination of Alkali Metal Compounds and Alkaline Earth Metal Compounds

About 0.5 g of a sample was precisely weighed out and subjected to closed pressure decomposition with sulfuric acid and nitric acid. For the closed pressure decomposition, use was made of microwave decomposer MULTIWAV, manufactured by PerkinElmer, Inc.

The solution resulting from the decomposition was suitably diluted with pure water and analyzed by ICP-MS (ELEMENT, manufactured by ThermoQuest). The alkalis and alkaline earth metals determined were Li, Na, K, Cs, Mg, Ca, and Ba. The detection limit concentrations of these are shown in Table 10.

The isosorbide used for reaction was one manufactured by Roquette Freres or by Sanko Chemical Co., Ltd.; 1,4-cyclohexanedimethanol by Eastman Chemical Co.; cesium carbonate by Wako Pure Chemical Industries Ltd.; diphenyl carbonate by Mitsubishi Chemical Corp.; tricyclodecanedimethanol by Celanese Ltd.; pentacyclodecanedimethanol by Celanese Ltd.; 1,3-adamantanediol by Aldrich Co.; 1,4-butanediol by Mitsubishi Chemical Corp.; 1,6-hexanediol by Wako Pure Chemical Industries Ltd.; and 9,9-bis(4-(2-hydroxyethoxy)phenyl)fluorene and 9,9-biscresolfluorene by Osaka Gas Chemical Co., Ltd.

The isosorbide used in Examples 1 to 34 had a formic acid content of 5 ppm, an alkali metal content of 0.03 ppm, which was a sodium content (0.19 μmol per mole of the isosorbide), and an alkaline earth metal content of 0.02 ppm, which was a calcium content (0.073 μmol per mole of the isosorbide).

The contents of alkali metals and alkaline earth metals in the isosorbide, TCDDM, and CHDM used are shown in Tables 11 and 12.

The method of isosorbide distillation in Examples 35 to 45 and Comparative Examples 5 and 6 is as follows.

<Distillation of Isosorbide>

About 1.3 kg of isosorbide was placed in a 2-L flask in an argon stream. A Claisen tube was attached to the flask, and a receiver was attached through a fraction cutter. The piping and other parts were thermally insulated in order to prevent solidification. After gradual pressure reduction was initiated, the contents were heated. The isosorbide dissolved at an internal temperature of about 100° C. Thereafter, a distillate began to be discharged at an internal temperature of 160° C. At this stage, the pressure was 133-266 Pa. After the initial distillate was obtained, distillation was performed at an internal temperature of 160-170° C., column top temperature of 150-157° C., and 133 Pa. After completion of the distillation, argon was introduced to return the internal pressure to ordinary pressure. The distilled product obtained was pulverized with cooling in an argon stream to obtain distillation-purified isosorbide (about 1 kg). Unless otherwise indicated, this isosorbide was stored in a sealed aluminum laminate bag together with Ageless (manufactured by Mitsubishi Gas Chemical Co., Ltd.) enclosed therein, at room temperature in a nitrogen stream, except the isosorbide for use in Examples 40 and 42 and Comparative Examples 5 and 6.

The following are abbreviations for compounds used in the Examples given below.
ISOB: isosorbide
1,4-CHDM: 1,4-cyclohexanedimethanol
TCDDM: tricyclodecanedimethanol
PCPDM: pentacyclopentadecanedimethanol
1,4-BG: 1,4-butanediol
1,6-HD: 1,6-hexanediol
BHEPF: 9,9-bis(4-(2-hydroxyethoxy)phenyl)fluorene
BCF: 9,9-biscresolfluorene
DPC: diphenyl carbonate Example 1

Into a reaction vessel were introduced 27.7 parts by weight (0.516 mol) of isosorbide, 13.0 parts by weight (0.246 mol) of 1,4-cyclohexanedimethanol (hereinafter abbreviated to "1,4-CHDM"), 59.2 parts by weight (0.752 mol) of diphenyl carbonate (hereinafter abbreviated to "DPC"), and $2.21 \times 10^{-4}$ parts by weight ($1.84 \times 10^{-6}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 15 minutes).

Subsequently, the pressure was changed from ordinary pressure to 13.3 kPa, and the temperature of the heating bath was elevated to 190° C. over 1 hour, during which the phenol which generated was discharged from the reaction vessel.

The whole reaction vessel was held at 190° C. for 15 minutes. Thereafter, a second step was conducted in the following manner. The internal pressure of the reaction vessel was reduced to 6.67 kPa, and the temperature of the heating bath was elevated to 230° C. over 15 minutes. The phenol which generated was discharged from the reaction vessel. Because the stirring torque of the stirrer increased, the temperature was elevated to 250° C. over 8 minutes. The internal pressure of the reaction vessel was reduced to or below 0.200 kPa in order to remove the phenol which generated further. After the stirring torque had reached a given value, the reaction was terminated. The reaction product yielded was extruded into water to obtain pellets of a polycarbonate copolymer.

The polycarbonate copolymer obtained had a reduced viscosity of 1.007 dL/g, a glass transition temperature of 124° C., and a color b value of 8.8. These results are shown in Table 1.

The polycarbonate copolymer was molded at 245° C. and a mold temperature of 90° C. to obtain test pieces having a length of 31.5 mm, width of 6.2 mm, and thickness of 3.2 mm and tensile test pieces having a parallel-part length of 9 mm and a parallel-part diameter of 1.5 mm. These test pieces were subjected to evaluation of mechanical properties. As a result, the polycarbonate copolymer was found to have a tensile strength at yield of 84 MPa, a tensile modulus at yield of 748 MPa, an elongation at yield of 16%, an elongation at break of 30%, and an Izod impact strength of 227 J/m$^2$. These results are shown in Table 2.

Furthermore, the polycarbonate copolymer was pressed at 200° C. and formed into a film having a thickness of about 200 μm. This film had a d-line refractive index of 1.4992 and an Abbe number of 58. These results are shown in Table 3.

The polycarbonate copolymer had a 5% weight loss temperature in a nitrogen atmosphere of 344° C. This result is shown in Table 4.

Moreover, the polycarbonate copolymer was examined for gas generation amount. As a result, the amount of generated gases other than phenol ingredients was 3.7 ng/cm$^2$. No generated gas derived from any dihydroxy compound other than the dihydroxy compounds represented by general formula (1) was detected. This result is shown in Table 6. An NMR chart of the polycarbonate copolymer is shown in FIG. 1.

Example 2

Into a reaction vessel were introduced 31.8 parts by weight (0.458 mol) of isosorbide, 8.7 parts by weight (0.127 mol) of 1,4-CHDM, 59.5 parts by weight (0.583 mol) of DPC, and 2.22×10$^{-4}$ parts by weight (1.43×10$^{-6}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 15 minutes).

Subsequently, the pressure was changed from ordinary pressure to 13.3 kPa, and the temperature of the heating bath was elevated to 190° C. over 1 hour, during which the phenol which generated was discharged from the reaction vessel.

The whole reaction vessel was held at 190° C. for 15 minutes. Thereafter, a second step was conducted in the following manner. The internal pressure of the reaction vessel was reduced to 6.67 kPa, and the temperature of the heating bath was elevated to 240° C. over 20 minutes. The phenol which generated was discharged from the reaction vessel. Because the stirring torque of the stirrer increased, the internal pressure of the reaction vessel was reduced to or below 0.200 kPa in order to remove the phenol which generated further. After the stirring torque had reached a given value, the reaction was terminated. The reaction product yielded was extruded into water to obtain pellets of a polycarbonate copolymer.

The polycarbonate copolymer obtained had a reduced viscosity of 0.757 dL/g, a glass transition temperature of 133° C., and a color b value of 8.2. These results are shown in Table 1.

Furthermore, the polycarbonate copolymer was pressed at 200° C. and formed into a film having a thickness of about 200 μm. This film had a d-line refractive index of 1.5004 and an Abbe number of 57. These results are shown in Table 3.

The polycarbonate copolymer had a 5% weight loss temperature in a nitrogen atmosphere of 343° C. This result is shown in Table 4.

Moreover, the polycarbonate copolymer was examined for photoelastic coefficient. As a result, the photoelastic coefficient thereof was found to be 20×10$^{-12}$ Pa$^{-1}$. This result is shown in Table 5 together with the value of glass transition temperature.

Example 3

The same procedure as in Example 2 was conducted, except that the ingredient amounts were changed to the following: isosorbide, 35.9 parts by weight (0.674 mol); 1,4-CHDM, 4.4 parts by weight (0.083 mol); DPC, 59.7 parts by weight (0.764 mol); and cesium carbonate as a catalyst, 2.22×10$^{-4}$ parts by weight (1.87×10$^{-6}$ mol).

The polycarbonate copolymer obtained had a reduced viscosity of 0.712 dL/g, a glass transition temperature of 148° C., and a color b value of 9.1. These results are shown in Table 1.

Furthermore, the polycarbonate copolymer was pressed at 200° C. and formed into a film having a thickness of about 200 μm. This film had a d-line refractive index of 1.5014 and an Abbe number of 57. These results are shown in Table 3.

Example 4

The same procedure as in Example 1 was conducted, except that the ingredient amounts were changed to the following: isosorbide, 19.7 parts by weight (0.363 mol); 1,4-CHDM, 21.6 parts by weight (0.404 mol); DPC, 58.8 parts by weight (0.741 mol); and cesium carbonate as a catalyst, 2.19×10$^{-4}$ parts by weight (1.82×10$^{-6}$ mol).

The polycarbonate copolymer obtained had a reduced viscosity of 1.196 dL/g, a glass transition temperature of 101° C., and a color b value of 7.7. These results are shown in Table 1.

The polycarbonate copolymer was molded at a temperature of 245° C. and a mold temperature of 80° C. to obtain test pieces having a length of 31.5 mm, width of 6.2 mm, and thickness of 3.2 mm and tensile test pieces having a parallel-part length of 9 mm and a parallel-part diameter of 1.5 mm. These test pieces were subjected to evaluation of mechanical properties. As a result, the polycarbonate copolymer was found to have a tensile strength at yield of 66 MPa, a tensile modulus at yield of 595 MPa, an elongation at yield of 16%, an elongation at break of 27%, and an Izod impact strength of 293 J/m². These results are shown in Table 2.

Furthermore, the polycarbonate copolymer was pressed at 200° C. and formed into a film having a thickness of about 200 μm. This film had a d-line refractive index of 1.4993 and an Abbe number of 61. These results are shown in Table 3.

The polycarbonate copolymer had a 5% weight loss temperature in a nitrogen atmosphere of 345° C. This result is shown in Table 4.

Example 5

Into a reaction vessel were introduced 15.7 parts by weight (0.288 mol) of isosorbide, 25.8 parts by weight (0.480 mol) of 1,4-CHDM, 58.6 parts by weight (0.734 mol) of DPC, and $2.18 \times 10^{-4}$ parts by weight ($1.80 \times 10^{-6}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 15 minutes).

Subsequently, the pressure was changed from ordinary pressure to 13.3 kPa, and the temperature of the heating bath was elevated to 190° C. over 1 hour, during which the phenol which generated was discharged from the reaction vessel. The reaction vessel was held at 190° C. for 30 minutes. Thereafter, a second step was conducted in the following manner. The internal pressure of the reaction vessel was reduced to 6.67 kPa, and the temperature of the heating bath was elevated to 240° C. over 45 minutes. The phenol which generated was discharged from the reaction vessel. Although the stirring torque of the stirrer increased, the internal pressure of the reaction vessel was reduced to or below 0.200 kPa in order to remove the phenol which generated further. After the stirring torque had reached a given value, the reaction was terminated. The reaction product yielded was extruded into water to obtain pellets.

The polycarbonate copolymer obtained had a reduced viscosity of 1.186 dL/g, a glass transition temperature of 89° C., and a color b value of 5.1. These results are shown in Table 1.

The polycarbonate copolymer was molded at a temperature of 245° C. and a mold temperature of 70° C. to obtain test pieces having a length of 31.5 mm, width of 6.2 mm, and thickness of 3.2 mm and tensile test pieces having a parallel-part length of 9 mm and a parallel-part diameter of 1.5 mm. These test pieces were subjected to evaluation of mechanical properties. As a result, the polycarbonate copolymer was found to have a tensile strength at yield of 59 MPa, a tensile modulus at yield of 541 MPa, an elongation at yield of 15%, an elongation at break of 70%, and an Izod impact strength of 784 J/m². These results are shown in Table 2.

Furthermore, the polycarbonate copolymer was pressed at 200° C. to obtain a film having a thickness of about 200 μm. This film had a d-line refractive index of 1.4993 and an Abbe number of 62. These results are shown in Table 3.

Example 6

The same procedure as in Example 2 was conducted, except that the ingredient amounts were changed to the following: isosorbide, 27.7 parts by weight (0.516 mol); 1,4-CHDM, 13.0 parts by weight (0.246 mol); DPC, 59.2 parts by weight (0.752 mol); and cesium carbonate as a catalyst, $2.21 \times 10^{-4}$ parts by weight ($1.84 \times 10^{-6}$ mol).

The polycarbonate copolymer obtained had a reduced viscosity of 0.979 dL/g, a glass transition temperature of 124° C., and a color b value of 9.5. These results are shown in Table 1.

The polycarbonate copolymer was molded at a temperature of 245° C. and a mold temperature of 90° C. to obtain test pieces having a length of 31.5 mm, width of 6.2 mm, and thickness of 3.2 mm and tensile test pieces having a parallel-part length of 9 mm and a parallel-part diameter of 1.5 mm. These test pieces were subjected to evaluation of mechanical properties. As a result, the polycarbonate copolymer was found to have a tensile strength at yield of 78 MPa, a tensile modulus at yield of 691 MPa, an elongation at yield of 16%, an elongation at break of 47%, and an Izod impact strength of 184 J/m². These results are shown in Table 2.

Furthermore, the polycarbonate copolymer had a pencil hardness of H. This result is shown in Table 7.

Example 7

The same procedure as in Example 2 was conducted, except that the starting-material amounts were changed to 27.7 parts by weight (0.516 mol) for isosorbide, 13.0 parts by weight (0.246 mol) for 1,4-CHDM, and 59.2 parts by weight (0.752 mol) for DPC, and that the catalyst was replaced by $8.7 \times 10^{-5}$ parts by weight ($5.9 \times 10^{-6}$ mol) of sodium hydroxide.

The polycarbonate copolymer obtained had a reduced viscosity of 0.965 dL/g, a glass transition temperature of 123° C., and a color b value of 9.4. These results are shown in Table 1.

Example 8

The same procedure as in Example 2 was conducted, except that the ingredient amounts were changed to the following: isosorbide, 28.2 parts by weight (0.516 mol); 1,4-CHDM, 13.3 parts by weight (0.246 mol); DPC, 58.5 parts by weight (0.730 mol); and cesium carbonate as a catalyst, $2.25 \times 10^{-4}$ parts by weight ($1.84 \times 10^{-6}$ mol).

The polycarbonate copolymer obtained had a reduced viscosity of 0.496 dL/g, a glass transition temperature of 122° C., and a color b value of 9.6. These results are shown in Table 1.

Furthermore, the polycarbonate copolymer had a pencil hardness of H. This result is shown in Table 7.

Example 9

The same procedure as in Example 2 was conducted, except that the ingredient amounts were changed to the following: isosorbide, 27.7 parts by weight (0.516 mol); 1,4-CHDM, 13.0 parts by weight (0.246 mol); DPC, 59.2 parts by weight (0.752 mol); and cesium carbonate as a catalyst, $2.21 \times 10^{-5}$ parts by weight ($1.84 \times 10^{-7}$ mol).

The polycarbonate copolymer obtained had a reduced viscosity of 0.910 dL/g, a glass transition temperature of 124° C., and a color b value of 9.8. These results are shown in Table 1.

Example 10

The same procedure as in Example 2 was conducted, except that the ingredient amounts were changed to the following: isosorbide, 27.7 parts by weight (0.516 mol); 1,4-CHDM, 13.0 parts by weight (0.246 mol); DPC, 59.2 parts by weight (0.752 mol); and cesium carbonate as a catalyst, 2.21× $10^{-3}$ parts by weight ($1.84 \times 10^{-5}$ mol).

The polycarbonate copolymer obtained had a reduced viscosity of 0.980 dL/g, a glass transition temperature of 124° C., and a color b value of 8.3. These results are shown in Table 1.

Example 11

The same procedure as in Example 2 was conducted, except that the starting-material amounts were changed to 27.7 parts by weight (0.516 mol) for isosorbide, 13.0 parts by weight (0.246 mol) for 1,4-CHDM, and 59.2 parts by weight (0.752 mol) for DPC, and that 0.096 parts by weight of heat stabilizer "PEP-36" (bis(2,6-di-tert-butyl-4-methylphenyl) pentaerythritol diphosphite manufactured by Asahi Denka K.K.) was introduced into the reaction vessel together with the starting materials to polymerize the starting materials.

The polycarbonate copolymer obtained had a reduced viscosity of 0.975 dL/g, a glass transition temperature of 124° C., and a color b value of 7.2. These results are shown in Table 1.

Example 12

The same procedure as in Example 2 was conducted, except that the ingredient amounts were changed to 19.7 parts by weight (0.363 mol) for isosorbide, 21.6 parts by weight (0.404 mol) for 1,4-CHDM, 58.8 parts by weight (0.741 mol) for DPC, and $2.19 \times 10^{-4}$ parts by weight ($1.82 \times 10^{-6}$ mol) for cesium carbonate as a catalyst, and that 0.096 parts by weight of heat stabilizer "PEP-36" (bis(2,6-di-tert-butyl-4-methylphenyl)pentaerythritol diphosphite manufactured by Asahi Denka K.K.) was introduced into the reaction vessel together with the starting materials to polymerize the starting materials.

The polycarbonate copolymer obtained had a reduced viscosity of 0.850 dL/g, a glass transition temperature of 100° C., and a color b value of 3.6. These results are shown in Table 1.

Example 13

Into a reaction vessel were introduced 26.9 parts by weight (0.483 mol) of isosorbide, 15.8 parts by weight (0.211 mol) of tricyclodecanedimethanol (hereinafter abbreviated to "TCDDM"), 57.4 parts by weight (0.704 mol) of DPC, and $2.14 \times 10^{-4}$ parts by weight ($1.73 \times 10^{-6}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 15 minutes).

Subsequently, the pressure was reduced from ordinary pressure to 13.3 kPa over 40 minutes, and the temperature of the heating bath was elevated to 190° C. over 40 minutes, during which the phenol which generated was discharged from the reaction vessel.

The whole reaction vessel was held at 190° C. for 15 minutes. Thereafter, a second step was conducted in the following manner. The temperature of the heating bath was elevated to 220° C. over 30 minutes. The internal pressure of the reaction vessel began to be reduced at 10 minutes after initiation of the heating, and was lowered to 0.200 kPa over 30 minutes to distil off the phenol which generated. After the stirring torque had reached a given value, the reaction was terminated. The reaction product yielded was extruded into water to obtain pellets of a polycarbonate copolymer.

The polycarbonate copolymer obtained had a reduced viscosity of 0.640 dL/g, a glass transition temperature of 126° C., and a color b value of 4.6. These results are shown in Table 1.

The polycarbonate copolymer was molded at 245° C. and a mold temperature of 90° C. to obtain test pieces having a length of 31.5 mm, width of 6.2 mm, and thickness of 3.2 mm and tensile test pieces having a parallel-part length of 9 mm and a parallel-part diameter of 1.5 mm. These test pieces were subjected to evaluation of mechanical properties. As a result, the polycarbonate copolymer was found to have a tensile strength at yield of 89 MPa, a tensile modulus at yield of 834 MPa, an elongation at yield of 15%, an elongation at break of 76%, and an Izod impact strength of 48 J/m². These results are shown in Table 2.

Furthermore, the polycarbonate copolymer was pressed at 200° C. and formed into a film having a thickness of about 200 μm. This film had a d-line refractive index of 1.5095 and an Abbe number of 62. These results are shown in Table 3.

The polycarbonate copolymer had a 5% weight loss temperature in a nitrogen atmosphere of 348° C. This result is shown in Table 4.

The polycarbonate copolymer was further examined for photoelastic coefficient. As a result, the photoelastic coefficient thereof was found to be $9 \times 10^{-12}$ Pa$^{-1}$. This result is shown in Table 5 together with the value of glass transition temperature.

Moreover, the polycarbonate copolymer was examined for gas generation amount. As a result, the amount of generated gases other than phenol ingredients was 4.5 ng/cm². No generated gas derived from any dihydroxy compound other than the dihydroxy compounds represented by general formula (1) was detected. This result is shown in Table 6.

Furthermore, the polycarbonate copolymer had a pencil hardness of F. This result is shown in Table 7.

Example 14

The same procedure as in Example 13 was conducted, except that the ingredient amounts were changed to the following: isosorbide, 35.5 parts by weight (0.660 mol); TCDDM, 5.4 parts by weight (0.075 mol); DPC, 59.0 parts by weight (0.748 mol); and cesium carbonate as a catalyst, $2.20 \times 10^{-4}$ parts by weight ($1.83 \times 10^{-6}$ mol).

The polycarbonate copolymer obtained had a reduced viscosity of 0.546 dL/g, a glass transition temperature of 144° C., and a color b value of 6.4. These results are shown in Table 1.

The polycarbonate copolymer was evaluated for mechanical properties. As a result, the copolymer was found to have a tensile strength at yield of 106 MPa, a tensile modulus at yield of 872 MPa, an elongation at yield of 16%, an elongation at break of 26%, and an Izod impact strength of 65 J/m². These results are shown in Table 2.

Furthermore, a film formed from the polycarbonate copolymer had a d-line refractive index of 1.5052 and an Abbe number of 60. These results are shown in Table 3.

Example 15

The same procedure as in Example 13 was conducted, except that the ingredient amounts were changed to the following: isosorbide, 31.1 part by weight (0.569 mol); TCDDM, 10.7 parts by weight (0.145 mol); DPC, 58.2 parts by weight (0.725 mol); and cesium carbonate as a catalyst, $2.17 \times 10^{-4}$ parts by weight ($1.78 \times 10^{-6}$ mol).

The polycarbonate copolymer obtained had a reduced viscosity of 0.644 dL/g, a glass transition temperature of 136° C., and a color b value of 2.8. These results are shown in Table 1.

The polycarbonate copolymer was evaluated for mechanical properties. As a result, the copolymer was found to have a tensile strength at yield of 107 MPa, a tensile modulus at yield of 934 MPa, an elongation at yield of 16%, an elongation at break of 39%, and an Izod impact strength of 58 J/m². These results are shown in Table 2.

Furthermore, a film formed from the polycarbonate copolymer had a d-line refractive index of 1.5090 and an Abbe number of 61. These results are shown in Table 3.

This polycarbonate copolymer had a 5% weight loss temperature in a nitrogen atmosphere of 344° C. This result is shown in Table 4.

Example 16

The same procedure as in Example 13 was conducted, except that the ingredient amounts were changed to the following: isosorbide, 22.7 parts by weight (0.403 mol); TCDDM, 20.7 parts by weight (0.274 mol); DPC, 56.6 parts by weight (0.684 mol); and cesium carbonate as a catalyst, $2.11 \times 10^{-4}$ parts by weight ($1.68 \times 10^{-6}$ mol).

The polycarbonate copolymer obtained had a reduced viscosity of 0.637 dL/g, a glass transition temperature of 118° C., and a color b value of 2.3. These results are shown in Table 1.

Furthermore, a film formed from the polycarbonate copolymer had a d-line refractive index of 1.5135 and an Abbe number of 58. These results are shown in Table 3.

This polycarbonate copolymer was further examined for photoelastic coefficient. As a result, the photoelastic coefficient thereof was found to be $7 \times 10^{-12}$ Pa$^{-1}$. This result is shown in Table 5 together with the value of glass transition temperature.

Example 17

The same procedure as in Example 13 was conducted, except that the ingredient amounts were changed to the following: isosorbide, 18.7 parts by weight (0.327 mol); TCDDM, 25.6 parts by weight (0.333 mol); DPC, 55.8 parts by weight (0.666 mol); and cesium carbonate as a catalyst, $2.08 \times 10^{-4}$ parts by weight ($1.63 \times 10^{-6}$ mol).

The polycarbonate copolymer obtained had a reduced viscosity of 0.785 dL/g, a glass transition temperature of 110° C., and a color b value of 4.7. These results are shown in Table 1.

The polycarbonate copolymer was evaluated for mechanical properties. As a result, the copolymer was found to have a tensile strength at yield of 79 MPa, a tensile modulus at yield of 807 MPa, an elongation at yield of 13%, an elongation at break of 18%, and an Izod impact strength of 58 J/m². These results are shown in Table 2.

Furthermore, a film formed from the polycarbonate copolymer had a d-line refractive index of 1.5157 and an Abbe number of 60. These results are shown in Table 3.

This polycarbonate copolymer had a 5% weight loss temperature in a nitrogen atmosphere of 349° C. This result is shown in Table 4.

Example 18

In a nitrogen atmosphere, 14.7 parts by weight (0.257 mol) of isosorbide, 30.3 parts by weight (0.394 mol) of TCDDM, 55.0 parts by weight (0.656 mol) of DPC, and $2.05 \times 10^{-4}$ parts by weight ($1.61 \times 10^{-6}$ mol) of cesium carbonate as a catalyst were subjected to a first step of reaction in the following manner. The temperature of a heating bath was elevated to 150° C., and the starting materials were dissolved with stirring according to need (about 15 minutes).

Subsequently, the pressure was reduced from ordinary pressure to 13.3 kPa over 3 minutes, and the temperature of the heating bath was elevated to 190° C. over 60 minutes, during which the phenol which generated was discharged from the reaction vessel.

The whole reaction vessel was held at 190° C. for 15 minutes. Thereafter, a second step was conducted in the following manner. The internal pressure of the reaction vessel was reduced to 6.67 kPa, and the temperature of the heating bath was elevated to 240° C. over 45 minutes. The phenol which generated was discharged from the reaction vessel. The internal pressure of the reaction vessel was reduced to or below 0.200 kPa in order to remove the phenol which generated further. After the stirring torque had reached a given value, the reaction was terminated. The reaction product yielded was extruded into water to obtain pellets of a polycarbonate copolymer.

The polycarbonate copolymer obtained had a reduced viscosity of 0.672 dL/g, a glass transition temperature of 102° C., and a color b value of 9.2. These results are shown in Table 1.

The polycarbonate copolymer was evaluated for mechanical properties. As a result, the copolymer was found to have a tensile strength at yield of 76 MPa, a tensile modulus at yield of 850 MPa, an elongation at yield of 12%, an elongation at break of 31%, and an Izod impact strength of 40 J/m². These results are shown in Table 2.

Furthermore, a film formed from the polycarbonate copolymer had a d-line refractive index of 1.5185 and an Abbe number of 58. These results are shown in Table 3.

This polycarbonate copolymer had a 5% weight loss temperature in a nitrogen atmosphere of 352° C. This result is shown in Table 4.

Example 19

Into a reaction vessel were introduced 25.6 parts by weight (0.339 mol) of isosorbide, 19.7 parts by weight (0.145 mol) of pentacyclopentadecanedimethanol (hereinafter abbreviated to "PCPDM"), 54.7 parts by weight (0.494 mol) of DPC, and $2.04 \times 10^{-4}$ parts by weight ($1.21 \times 10^{-6}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 15 minutes).

Subsequently, the pressure was reduced from ordinary pressure to 13.3 kPa over 40 minutes, and the temperature of the heating bath was elevated to 220° C. over 70 minutes, during which the phenol which generated was discharged from the reaction vessel.

The whole reaction vessel was held at 220° C. for 10 minutes. Thereafter, a second step was conducted in the following manner. While elevating the temperature of the heating bath to 240° C. over 20 minutes, the internal pressure of the reaction vessel was reduced to or below 0.200 kPa over 30 minutes to distil off the phenol which generated. After the stirring torque had reached a given value, the reaction was terminated. The reaction product yielded was extruded into water to obtain pellets of a polycarbonate copolymer.

The polycarbonate copolymer obtained had a reduced viscosity of 0.730 dL/g, a glass transition temperature of 149° C., and a color b value of 8.4. These results are shown in Table 1.

Furthermore, the polycarbonate copolymer was pressed at 200° C. and formed into a film having a thickness of about 200 μm. This film had a d-line refractive index of 1.5194 and an Abbe number of 60. These results are shown in Table 3.

The polycarbonate copolymer had a 5% weight loss temperature in a nitrogen atmosphere of 347° C. This result is shown in Table 4.

The polycarbonate copolymer was further examined for photoelastic coefficient. As a result, the photoelastic coefficient thereof was found to be $8 \times 10^{-12}$ $Pa^{-1}$. This result is shown in Table 5 together with the value of glass transition temperature.

Example 20

Into a reaction vessel were introduced 54.7 g (0.374 mol) of isosorbide, 31.5 g (0.161 mol) of adamantanedimethanol, 116.8 g (0.545 mol) of DPC, and $6.12 \times 10^{-4}$ g ($4.84 \times 10^{-6}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 15 minutes).

Subsequently, the pressure was reduced from ordinary pressure to 13.3 kPa over 40 minutes, and the temperature of the heating bath was elevated to 220° C. over 70 minutes, during which the phenol which generated was discharged from the reaction vessel.

The whole reaction vessel was held at 220° C. for 10 minutes. Thereafter, a second step was conducted in the following manner. While elevating the temperature of the heating bath to 230° C. over 20 minutes, the internal pressure of the reaction vessel was reduced to or below 0.200 kPa over 30 minutes to distil off the phenol which generated. After the stirring torque had reached a given value, the reaction was terminated. The reaction product yielded was extruded into water to obtain pellets of a polycarbonate copolymer.

The polycarbonate copolymer obtained had a reduced viscosity of 0.409 dL/g, a glass transition temperature of 125° C., and a color b value of 14.8. These results are shown in Table 1.

Example 21

The same procedure as in Example 20 was conducted, except that the starting materials were replaced by 54.5 g (0.373 mol) of isosorbide, 31.7 g (0.160 mol) of biscyclohexanediol, 116.4 g (0.543 mol) of DPC, and $2.04 \times 10^{-4}$ g ($1.21 \times 10^{-6}$ mol) of cesium carbonate as a catalyst.

The polycarbonate copolymer obtained had a reduced viscosity of 0.260 dL/g, a glass transition temperature of 125° C., and a color b value of 8.6. These results are shown in Table 1.

Example 22

Into a reaction vessel were introduced 11.7 parts by weight (0.165 mol) of isosorbide, 30.0 parts by weight (0.428 mol) of 1,4-CHDM, 58.3 parts by weight (0.561 mol) of DPC, and $2.18 \times 10^{-4}$ parts by weight ($1.38 \times 10^{-6}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 15 minutes).

Subsequently, the pressure was changed from ordinary pressure to 13.3 kPa, and the temperature of the heating bath was elevated to 190° C. over 1 hour, during which the phenol which generated was discharged from the reaction vessel. The reaction vessel was held at 190° C. for 30 minutes. Thereafter, a second step was conducted in the following manner. The internal pressure of the reaction vessel was reduced to 6.67 kPa, and the temperature of the heating bath was elevated to 220° C. over 45 minutes. The phenol which generated was discharged from the reaction vessel. Although the stirring torque increased, the internal pressure of the reaction vessel was reduced to or below 0.200 kPa in order to remove the phenol which generated further. After the stirring torque had reached a given value, the reaction was terminated. The reaction product yielded was extruded into water to obtain pellets.

The polycarbonate copolymer obtained had a reduced viscosity of 0.979 dL/g, a glass transition temperature of 74° C., and a color b value of 4.7. These results are shown in Table 1.

Furthermore, the polycarbonate copolymer was pressed at 200° C. to obtain a film having a thickness of about 200 μm. This film had a d-line refractive index of 1.5002 and an Abbe number of 56. These results are shown in Table 3.

Example 23

The same procedure as in Example 22 was conducted, except that the ingredient amounts were changed to the following: isosorbide, 7.8 parts by weight (0.142 mol); 1,4-CHDM, 34.1 part by weight (0.631 mol); DPC, 58.1 part by weight (0.723 mol); and cesium carbonate as a catalyst, $2.17 \times 10^{-4}$ parts by weight ($1.77 \times 10^{-6}$ mol).

The polycarbonate copolymer obtained had a reduced viscosity of 1.159 dL/g, a glass transition temperature of 63° C., and a color b value of 2.9. These results are shown in Table 1.

Furthermore, the polycarbonate copolymer was pressed at 200° C. to obtain a film having a thickness of about 200 μm. This film had a d-line refractive index of 1.5024 and an Abbe number of 56. These results are shown in Table 3.

Example 24

The same procedure as in Example 22 was conducted, except that the ingredient amounts were changed to the following: isosorbide, 3.9 parts by weight (0.070 mol); 1,4-CHDM, 38.2 parts by weight (0.703 mol); DPC, 57.9 parts by weight (0.717 mol); and cesium carbonate as a catalyst, $2.16 \times 10^{-4}$ parts by weight ($1.76 \times 10^{-6}$ mol).

The polycarbonate copolymer obtained had a reduced viscosity of 0.670 dL/g, a glass transition temperature of 51° C., and a color b value of 2.8. These results are shown in Table 1.

Example 25

The same procedure as in Example 22 was conducted, except that the ingredient amounts were changed to the following: isosorbide, 1.9 parts by weight (0.035 mol); 1,4-CHDM, 40.3 parts by weight (0.740 mol); DPC, 57.8 parts by weight (0.715 mol); and cesium carbonate as a catalyst, $2.15 \times 10^{-4}$ parts by weight ($1.75 \times 10^{-6}$ mol).

The polycarbonate copolymer obtained had a reduced viscosity of 0.640 dL/g, a glass transition temperature of 45° C., and a color b value of 3.0. These results are shown in Table 1.

Example 26

The same procedure as in Example 2 was conducted, except that the starting materials were replaced by 17.7 parts by weight (0.294 mol) of isosorbide, 10.6 parts by weight (0.059 mol) of 9,9-bis(4-(2-hydroxyethoxy)phenyl)fluorene (hereinafter abbreviated to BHEPF), 19.0 parts by weight (0.235 mol) of TCDDM, 52.8 parts by weight (0.598 mol) of DPC, and $2.5\times10^{-6}$ parts by weight ($4.7\times10^{-6}$ mol) of sodium chloride as a catalyst.

The polycarbonate copolymer obtained had a reduced viscosity of 0.668 dL/g, a glass transition temperature of 122° C., and a color b value of 11.2. These results are shown in Table 1.

Furthermore, the polycarbonate copolymer was pressed at 200° C. to obtain a film having a thickness of 200 μm. This film had a d-line refractive index of 1.5410 and an Abbe number of 42. These results are shown in Table 3.

Example 27

Into a reaction vessel were introduced 40.1 part by weight (0.581 mol) of isosorbide, 59.9 parts by weight (0.592 mol) of DPC, and $2.23\times10^{-4}$ parts by weight ($1.45\times10^{-6}$ mol) of cesium carbonate. The contents were heated from room temperature to 150° C. with stirring and dissolved (about 15 minutes).

Subsequently, the pressure was changed from ordinary pressure to 13.3 kPa, and the temperature was elevated to 190° C. over 1 hour, during which the phenol which generated was discharged from the system. The system was held at 190° C. for 15 minutes. Thereafter, the internal pressure of the reaction vessel was reduced to 6.67 kPa, and the temperature of the heating bath was elevated to 230° C. over 15 minutes. The phenol which generated was discharged. Because the stirring torque increased, the temperature was elevated to 250° C. over 8 minutes. The degree of vacuum was regulated to or below 0.200 kPa in order to remove the phenol which generated further. After the stirring torque had reached a given value, the reaction was terminated. It was attempted to extrude the reaction product into water in order to obtain pellets. However, extrusion was impossible. The reaction product was hence taken out as a mass.

The polycarbonate obtained had a reduced viscosity of 0.679 dL/g, a glass transition temperature of 160° C., and a color b value of 13.0. This polycarbonate had a larger value of b and had a brown color as compared with the polycarbonate copolymers of the Examples. These results are shown in Table 1.

Furthermore, it was attempted to mold the polycarbonate at 265° C. in order to obtain test pieces having a length of 31.5 mm, width of 6.2 mm, and thickness of 3.2 mm and tensile test pieces having a parallel-part length of 9 mm and a parallel-part diameter of 1.5 mm. However, this polycarbonate had a high melt viscosity and underwent considerable coloration and considerable foaming, resulting in a poor yield of molded objects. These test pieces were subjected to evaluation of mechanical properties. As a result, the polycarbonate was found to have a tensile strength at yield of 105 MPa, a tensile modulus at yield of 353 MPa, an elongation at yield of 17%, an elongation at break of 31%, and an Izod impact strength of 11 $J/m^2$. This polycarbonate was found to have a far lower Izod impact strength than the polycarbonate copolymers of the Examples. These results are shown in Table 2.

Furthermore, this polycarbonate was found to have a 5% weight loss temperature in a nitrogen atmosphere of 339° C., which was lower than those of the polycarbonate copolymers of the Examples. This result is shown in Table 4. Incidentally, this polycarbonate was pressed at 200° C. to obtain a film having a thickness of about 200 μm. This film was brittle and cracked when cut with scissors.

The following can be found from the results given above. In the case where isosorbide is used as the only dihydroxy compound, polymerization reaction proceeds satisfactorily so long as the isosorbide has a formic acid content lower than 20 ppm. However, the properties of the polycarbonate obtained are poorer than the properties of polycarbonate copolymers.

Reference Example 1

Into a reaction vessel were introduced 42.3 parts by weight (0.776 mol) of 1,4-CHDM, 57.7 parts by weight (0.712 mol) of DPC, and $2.15\times10^{-4}$ parts by weight ($1.75\times10^{-6}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 15 minutes).

Subsequently, the pressure was reduced from ordinary pressure to 13.3 kPa over 3 minutes, and this pressure was maintained. The temperature of the heating bath was elevated to 190° C. over 60 minutes, during which the phenol which generated was discharged from the reaction vessel.

The whole reaction vessel was held at 190° C. for 15 minutes. Thereafter, a second step was conducted in the following manner. The internal pressure of the reaction vessel was reduced to 6.67 kPa, and the temperature of the heating bath was elevated to 220° C. over 45 minutes. The phenol which generated was discharged from the reaction vessel. Although the stirring torque of the stirrer increased, the internal pressure of the reaction vessel was reduced to or below 0.200 kPa in order to remove the phenol which generated further. After the stirring torque had reached a given value, the reaction was terminated. The reaction product yielded was extruded into water to obtain pellets of a polycarbonate copolymer.

The polycarbonate copolymer obtained had a reduced viscosity of 0.662 dL/g, a glass transition temperature of 40° C., and a color b value of 4.5. Because of the low glass transition temperature, the pellets stuck to one another to form masses and chip formation was difficult. These results are shown in Table 1.

Reference Example 2

Commercial aromatic polycarbonate resin "Iupilon H4000" (manufactured by Mitsubishi Engineering-Plastics Corp.; reduced viscosity, 0.456 dL/g; glass transition temperature, 145° C.) was molded at 280° C. to obtain test pieces having a length of 31.5 mm, width of 6.2 mm, and thickness of 3.2 mm and tensile test pieces having a parallel-part length of 9 mm and a parallel-part diameter of 1.5 mm.

These test pieces were subjected to evaluation of mechanical properties. As a result, the aromatic polycarbonate resin was found to have a tensile strength at yield of 63 MPa, a tensile modulus at yield of 629 MPa, an elongation at yield of 13%, an elongation at break of 74%, and an Izod impact strength of 6 $J/m^2$. These results are shown in Table 2.

Furthermore, the aromatic polycarbonate resin was pressed at 200° C. to obtain a film having a thickness of about 200 μm. This film had a d-line refractive index of 1.5828 and an Abbe number of 30. The results are shown in Table 3.

The aromatic polycarbonate resin was further examined for photoelastic coefficient. As a result, the photoelastic coefficient thereof was found to be $72\times10^{-12}$ $Pa^{-1}$. This result is shown in Table 5 together with the value of glass transition temperature.

Moreover, the aromatic polycarbonate resin had a pencil hardness of 2B. This result is shown in Table 7.

Reference Example 3

Commercial aromatic polycarbonate resin "Iupilon S2000" (manufactured by Mitsubishi Engineering-Plastics Corp.; reduced viscosity, 0.507 dL/g) was molded at 280° C. to obtain test pieces having a length of 31.5 mm, width of 6.2 mm, and thickness of 3.2 mm and tensile test pieces having a parallel-part length of 9 mm and a parallel-part diameter of 1.5 mm.

These test pieces were subjected to evaluation of mechanical properties. As a result, the aromatic polycarbonate resin was found to have a tensile strength at yield of 63 MPa, a tensile modulus at yield of 565 MPa, an elongation at yield of 13%, an elongation at break of 85%, and an Izod impact strength as high as 641 J/m$^2$. These results are shown in Table 2.

Reference Example 4

Commercial poly(lactic acid) "Lacea H-440" (manufactured by Mitsui Chemicals, Inc.) was examined for 5% weight loss temperature in a nitrogen atmosphere. As a result, the 5% weight loss temperature thereof was found to be 320° C. This result is shown in Table 4.

Reference Example 5

Into a reaction vessel were introduced 47.8 parts by weight (0.586 mol) of TCDDM, 58.2 parts by weight (0.585 mol) of DPC, and 1.95×10$^{-4}$ parts by weight (1.44×10$^{-6}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 15 minutes).

Subsequently, while reducing the pressure from ordinary pressure to 13.3 kPa over 40 minutes, the temperature of the heating bath was elevated to 190° C. over 40 minutes. The phenol which generated was discharged from the reaction vessel.

The whole reaction vessel was held at 190° C. for 15 minutes. Thereafter, a second step was conducted in the following manner. The temperature of the heating bath was elevated to 220° C. over 30 minutes. The internal pressure of the reaction vessel began to be reduced at 10 minutes after initiation of the heating, and was lowered to 0.200 kPa over 30 minutes to distil off the phenol which generated. After the stirring torque had reached a given value, the reaction was terminated. The reaction product yielded was extruded into water to obtain pellets of a polycarbonate copolymer.

The polycarbonate copolymer obtained had a reduced viscosity of 0.899 dL/g, a glass transition temperature of 73° C., and a color b value of 3.9. These results are shown in Table 1.

Example 28

The same procedure as in Example 13 was conducted, except that the starting materials were replaced by 85.61 g (0.585 mol) of isosorbide, 22.6 g (0.251 mol) of 1,4-butanediol (hereinafter abbreviated to "1,4-BG"), 166.8 g (0.779 mol) of DPC, and 1.08×10$^{-4}$ g (0.87×10$^{-6}$ mol) of cesium carbonate as a catalyst.

The polycarbonate copolymer obtained had a reduced viscosity of 0.568 dL/g, a glass transition temperature of 116° C., and a color b value of 12.4. These results are shown in Table 1.

The polycarbonate copolymer had a 5% weight loss temperature in a nitrogen atmosphere of 339° C. This result is shown in Table 4.

The polycarbonate copolymer was further examined for photoelastic coefficient. As a result, the photoelastic coefficient thereof was found to be 23×10$^{-12}$ Pa$^{-1}$. This result is shown in Table 5 together with the value of glass transition temperature.

Furthermore, the polycarbonate copolymer was examined for gas generation amount. As a result, the amount of generated gases other than phenol ingredients was 10.0 ng/cm$^2$. Tetrahydrofuran (THF) was detected in an amount of 2.0 ng/cm$^2$ as a gas derived from a dihydroxy compound other than the dihydroxy compounds represented by general formula (1). This result is shown in Table 6.

Example 29

The same procedure as in Example 13 was conducted, except that the starting materials were replaced by 81.22 g (0.556 mol) of isosorbide, 28.2 g (0.239 mol) of 1,6-hexanediol (hereinafter abbreviated to "1,6-HD"), 161.6 g (0.754 mol) of DPC, and 1.08×10$^{-4}$ g (0.87×10$^{-6}$ mol) of cesium carbonate as a catalyst.

The polycarbonate copolymer obtained had a reduced viscosity of 1.063 dL/g, a glass transition temperature of 85° C., and a color b value of 8.9. These results are shown in Table 1.

The polycarbonate copolymer had a 5% weight loss temperature in a nitrogen atmosphere of 336° C. This result is shown in Table 4.

The polycarbonate copolymer was further examined for photoelastic coefficient. As a result, the photoelastic coefficient thereof was found to be 20×10$^{-12}$ Pa$^{-1}$. This result is shown in Table 5 together with the value of glass transition temperature.

Furthermore, the polycarbonate copolymer was examined for gas generation amount. As a result, the amount of generated gases other than phenol ingredients was 11.0 ng/cm$^2$. Cyclohexadiene and cyclohexyl phenyl ether were detected in an amount of 5.6 ng/cm$^2$ as gases derived from dihydroxy compounds other than the dihydroxy compounds represented by general formula (1). This result is shown in Table 6.

Moreover, the polycarbonate copolymer had a pencil hardness of HB. This result is shown in Table 7.

Example 30

The same procedure as in Example 13 was conducted, except that the starting materials were replaced by 63.84 g (0.437 mol) of isosorbide, 27.6 g (0.0729 mol) of 9,9-biscresolfluorene (hereinafter abbreviated to "BCF"), 19.7 g (0.219 mol) of 1,4-BG, 145.04 g (0.677 mol) of DPC, and 1.08×10$^{-4}$ g (0.87×10$^{-6}$ mol) of cesium carbonate as a catalyst.

The polycarbonate copolymer obtained had a reduced viscosity of 0.464 dL/g, a glass transition temperature of 129° C., and a color b value of 8.3. These results are shown in Table 1.

The polycarbonate copolymer was further examined for photoelastic coefficient. As a result, the photoelastic coefficient thereof was found to be 23×10$^{-12}$ Pa$^{-1}$. This result is shown in Table 5 together with the value of glass transition temperature.

Example 31

The same procedure as in Example 7 was conducted, except that the starting materials were replaced by 16.7 parts by weight (0.265 mol) of isosorbide, 20.0 parts by weight (0.106 mol) of BHEPF, 13.4 parts by weight (0.159 mol) of TCDDM, 49.9 parts by weight (0.540 mol) of DPC, and $2.3 \times 10^{-6}$ parts by weight ($4.23 \times 10^{-6}$ mol) of sodium chloride as a catalyst.

The polycarbonate copolymer obtained had a reduced viscosity of 0.624 dL/g, a glass transition temperature of 123° C., and a color b value of 9.7. These results are shown in Table 1.

Furthermore, the polycarbonate copolymer was pressed under the conditions of 200° C. to obtain a film having a thickness of 200 µm. This film had a d-line refractive index of 1.5617 and an Abbe number of 36. These results are shown in Table 3.

Example 32

The same procedure as in Example 7 was conducted, except that the starting materials were replaced by 15.8 parts by weight (0.241 mol) of isosorbide, 28.5 parts by weight (0.144 mol) of BHEPF, 8.5 parts by weight (0.096 mol) of TCDDM, 47.3 parts by weight (0.491 mol) of DPC, and $2.1 \times 10^{-6}$ parts by weight ($3.9 \times 10^{-6}$ mol) of sodium chloride as a catalyst.

The polycarbonate copolymer obtained had a reduced viscosity of 0.586 dL/g, a glass transition temperature of 133° C., and a color b value of 8.4. These results are shown in Table 1.

Furthermore, the polycarbonate copolymer was pressed under the conditions of 200° C. to obtain a film having a thickness of 200 µm. This film had a d-line refractive index of 1.5800 and an Abbe number of 31. These results are shown in Table 3.

Example 33

Into a reaction vessel were introduced 26.9 parts by weight (0.483 mol) of isosorbide, 15.5 parts by weight (0.207 mol) of TCDDM, 57.8 parts by weight (0.709 mol) of DPC, and $2.15 \times 10^{-4}$ parts by weight ($1.73 \times 10^{-6}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 60 minutes).

Subsequently, the pressure was reduced from ordinary pressure to 13.3 kPa over 40 minutes, and the temperature of the heating bath was elevated to 190° C. over 40 minutes, during which the phenol which generated was discharged from the reaction vessel.

The whole reaction vessel was held at 190° C. for 15 minutes. Thereafter, a second step was conducted in the following manner. The temperature of the heating bath was elevated to 220° C. over 30 minutes. The internal pressure of the reaction vessel began to be reduced at 10 minutes after the temperature reached 220° C., and was lowered to 0.200 kPa over 30 minutes to distil off the phenol which generated. After the stirring torque had reached a given value, the reaction was terminated. The reaction product yielded was extruded into water to obtain pellets of a polycarbonate copolymer.

The polycarbonate copolymer obtained had a reduced viscosity of 0.506 dL/g, a glass transition temperature of 126° C., and a color b value of 10.0.

Incidentally, the isosorbide used in this Example had an alkali metal content of 0.03 ppm, which was a sodium content (0.19 µmol per mole of the isosorbide), and an alkaline earth metal content of 0.02 ppm, which was a calcium content (0.073 µmol per mole of the isosorbide). The contents of alkali metals and alkaline earth metals in the TCDDM were below the detection limits. These results are shown in Table 8.

Figure 2:
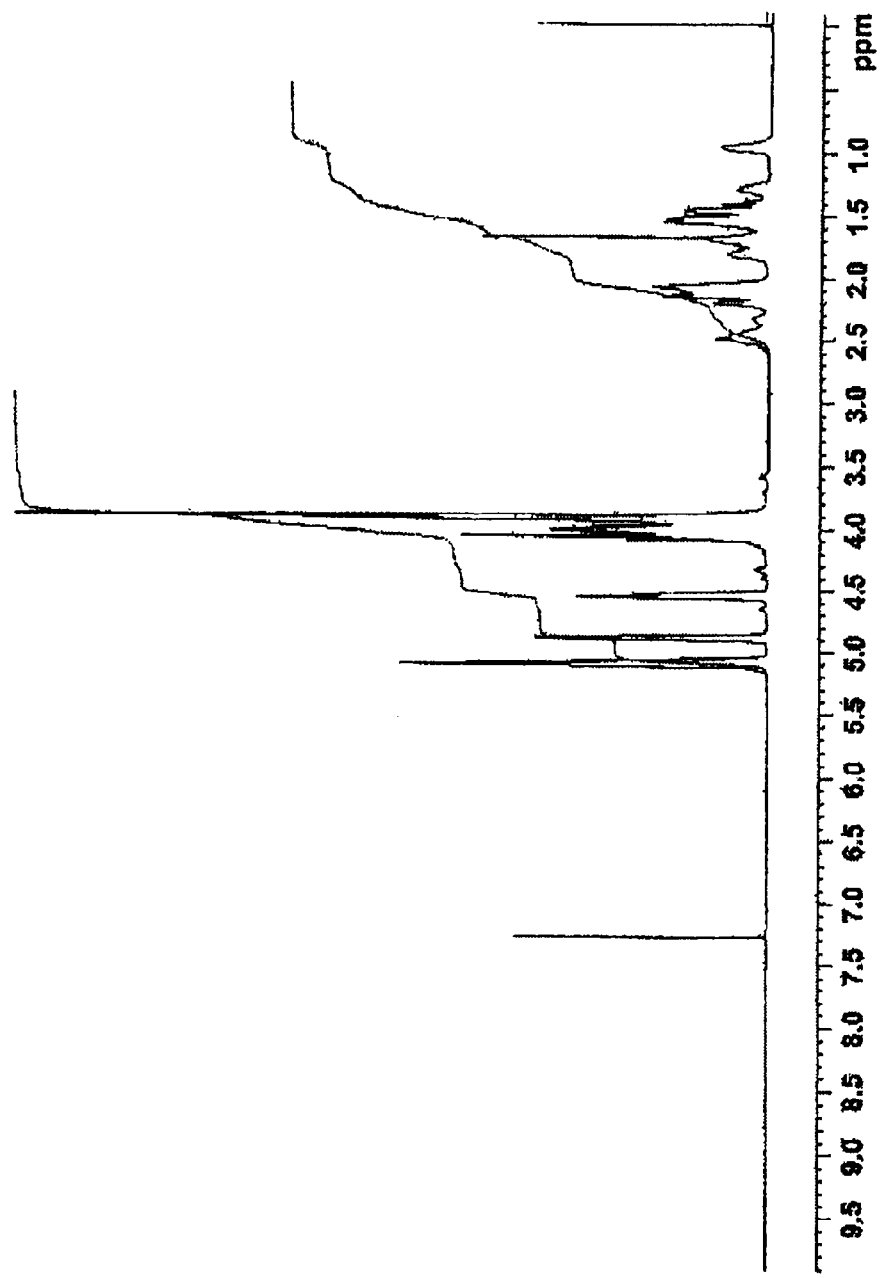
FIG. 2 is a presentation showing an NMR chart of the polycarbonate produced in Example 33.

An NMR chart of this polycarbonate copolymer is shown in FIG. 2.

Example 34

The same procedure as in Example 2 was conducted, except that the ingredient amounts were changed to the following: isosorbide, 27.7 parts by weight (0.516 mol); CHDM, 13.0 parts by weight (0.246 mol); DPC, 59.2 parts by weight (0.752 mol); and cesium carbonate as a catalyst, $2.21 \times 10^{-4}$ parts by weight ($1.84 \times 10^{-6}$ mol).

The polycarbonate copolymer obtained had a reduced viscosity of 0.621 dL/g, a glass transition temperature of 123° C., and a color b value of 11.0.

Incidentally, the isosorbide used in this Example had an alkali metal content of 0.03 ppm, which was a sodium content (0.19 µmol per mole of the isosorbide), and an alkaline earth metal content of 0.02 ppm, which was a calcium content (0.073 µmol per mole of the isosorbide). The CHDM had an alkali metal content of 0.01 ppm, which was a sodium content (0.063 µmol per mole of the CHDM), and an alkaline earth metal content of 0.01 ppm, which was a calcium content (0.036 µmol per mole of the CHDM). These results are shown in Table 8.

Example 35

The same procedure as in Example 13 was conducted, except that isosorbide having a formic acid content reduced to 3 ppm by distillation was used.

The polycarbonate obtained had a reduced viscosity of 0.510 dL/g, a glass transition temperature of 126° C., and a color b value of 4.5.

Incidentally, the isosorbide used in this Example had an alkali metal content of 0.17 ppm, which was a sodium content (1.08 µmol per mole of the isosorbide). With respect to alkaline earth metal contents, the isosorbide had a magnesium content of 0.02 ppm (0.12 µmol per mole of the isosorbide) and a calcium content of 0.02 ppm (0.073 µmol per mole of the isosorbide). The contents of alkali metals and alkaline earth metals in the TCDDM were below the detection limits. These results are shown in Table 8.

Example 36

The same procedure as in Example 13 was conducted, except that isosorbide having a formic acid content reduced to 2 ppm by distillation was used.

The polycarbonate obtained had a reduced viscosity of 0.640 dL/g, a glass transition temperature of 126° C., and a color b value of 3.7.

Incidentally, the isosorbide used in this Example had an alkali metal content of 0.02 ppm, which was a sodium content (0.13 µmol per mole of the isosorbide), and the contents of alkaline earth metals therein were below the detection limits. The contents of alkali metals and alkaline earth metals in the TCDDM were below the detection limits. These results are shown in Table 8.

Example 37

The same procedure as in Example 2 was conducted, except that isosorbide having a formic acid content reduced to 3 ppm by distillation was used.

The polycarbonate obtained had a reduced viscosity of 0.658 dL/g, a glass transition temperature of 133° C., and a color b value of 7.0.

Incidentally, the isosorbide used in this Example had an alkali metal content of 0.17 ppm, which was a sodium content (1.08 μmol per mole of the isosorbide). With respect to alkaline earth metal contents, the isosorbide had a magnesium content of 0.02 ppm (0.12 μmol per mole of the isosorbide) and a calcium content of 0.02 ppm (0.073 μmol per mole of the isosorbide). The CHDM had an alkali metal content of 0.01 ppm, which was a sodium content (0.063 μmol per mole of the CHDM), and an alkaline earth metal content of 0.01 ppm, which was a calcium content (0.036 μmol per mole of the CHDM). These results are shown in Table 8.

Example 38

The same procedure as in Example 2 was conducted, except that isosorbide having a formic acid content reduced to 2 ppm by distillation was used.

The polycarbonate obtained had a reduced viscosity of 0.590 dL/g, a glass transition temperature of 133° C., and a color b value of 6.5.

Incidentally, the isosorbide used in this Example had an alkali metal content of 0.02 ppm, which was a sodium content (0.13 μmol per mole of the isosorbide). The contents of alkaline earth metals therein were below the detection limits. The CHDM had an alkali metal content of 0.01 ppm, which was a sodium content (0.063 μmol per mole of the CHDM), and an alkaline earth metal content of 0.01 ppm, which was a calcium content (0.036 μmol per mole of the CHDM). These results are shown in Table 8.

Comparative Example 1

The same procedure as in Example 13 was conducted, except that use was made of isosorbide having a formic acid content of 400 ppm, a sodium content of 12.0 ppm (76.28 μmol per mole of the isosorbide), a potassium content of 0.06 ppm (0.22 μmol per mole of the isosorbide), and a calcium content of 0.02 ppm (0.073 μmol per mole of the isosorbide).

Although phenol was discharged as a distillate, the liquid reaction mixture gradually colored and no increase in torque was observed. No polymer was obtained. These results are shown in Table 8.

Comparative Example 2

The same procedure as in Example 13 was conducted, except that use was made of isosorbide having a formic acid content of 50 ppm, a sodium content of 12.0 ppm (76.28 μmol per mole of the isosorbide), a potassium content of 0.06 ppm (0.22 μmol per mole of the isosorbide), and a calcium content of 0.02 ppm (0.073 μmol per mole of the isosorbide).

Although phenol was discharged as a distillate, the liquid reaction mixture gradually colored and no increase in torque was observed. No polymer was obtained. These results are shown in Table 8.

Comparative Example 3

The same procedure as in Example 13 was conducted, except that use was made of isosorbide having a formic acid content of 20 ppm, a sodium content of 8.9 ppm (56.57 μmol per mole of the isosorbide), a potassium content of 0.06 ppm (0.22 μmol per mole of the isosorbide), and alkaline earth metal contents below the detection limits.

Although phenol was discharged as a distillate, the liquid reaction mixture gradually colored and no increase in torque was observed. No polymer was obtained. These results are shown in Table 8.

Comparative Example 4

The same procedure as in Example 2 was conducted, except that use was made of isosorbide having a formic acid content of 50 ppm, a sodium content of 12.0 ppm (76.28 μmol per mole of the isosorbide), a potassium content of 0.06 ppm (0.22 μmol per mole of the isosorbide), and a calcium content of 0.02 ppm (0.073 μmol per mole of the isosorbide) and CHDM having a sodium content of 0.01 ppm (0.063 μmol per mole of the CHDM) and a calcium content of 0.01 ppm (0.036 μmol per mole of the CHDM).

Although phenol was discharged as a distillate, the liquid reaction mixture gradually colored and no increase in torque was observed. No polymer was obtained. These results are shown in Table 8.

Example 39

Into a reaction vessel were introduced 71.1 g (0.487 mol) of isosorbide (formic acid content, 3 ppm), 45.5 g (0.209 mol) of a liquid mixture of TCDDM/water=9/1 by weight, 153.4 g (0.716 mol) of DPC (molar ratio of DPC/all diols, 1.03), and $1.42 \times 10^{-5}$ g ($7.08 \times 10^{-5}$ mol) of cesium carbonate as a catalyst. In a nitrogen atmosphere, a first step of reaction was conducted in the following manner. The temperature of a heating bath was elevated to 150° C., and the starting materials were dissolved with stirring according to need (about 60 minutes).

Subsequently, the pressure was reduced from ordinary pressure to 13.3 kPa over 40 minutes, and the pressure of 13.3 kPa was maintained thereafter. The temperature of the heating bath began to be elevated from 150° C. simultaneously with initiation of the pressure reduction, and was increased to 220° C. over 70 minutes, during which the phenol which generated was discharged from the reaction vessel.

The whole reaction vessel was held at 220° C. for 10 minutes. Thereafter, a second step was conducted in the following manner. The temperature of the heating bath was elevated to 230° C. over 10 minutes. The internal pressure of the reaction vessel began to be reduced simultaneously with initiation of the heating, and was lowered to or below 0.200 kPa over 30 minutes to distil off the phenol which generated. After the stirring torque had reached a given value, the reaction was terminated. The reaction product yielded was extruded into water to obtain pellets of a polycarbonate copolymer.

The polycarbonate copolymer obtained had a reduced viscosity of 0.657 dL/g, a glass transition temperature of 126° C., and a color b value of 6.8. These results are shown in Table 9.

Example 40

The same procedure as in Example 39 was conducted, except that 71.1 g (0.487 mol) of isosorbide (formic acid content, 3 ppm) was weighed in a polymerization tube, subsequently stored for 8 days in an atmospheric environment of 40° C. and 80% RH, and then used. The isosorbide after the storage had a formic acid content of 5 ppm. The weight of the isosorbide increased by 15.6 g. The isosorbide absorbed moisture and became liquid.

The polycarbonate copolymer obtained had a reduced viscosity of 0.672 dL/g, a glass transition temperature of 126° C., and a color b value of 7.6. These results are shown in Table 9.

Example 41

The same procedure as in Example 39 was conducted, except that about 100 g of isosorbide (formic acid content, 3 ppm) was put in an aluminum bag together with two packages of Ageless (manufactured by Mitsubishi Gas Chemical Co., Ltd.) SA-100, stored for 10 days in an environment of 40° C. and 80% RH, and then used in an amount of 71.1 g (0.487 mol). The isosorbide after the storage had a formic acid content of 3 ppm. The weight of the isosorbide did not increase.

The polycarbonate copolymer obtained had a reduced viscosity of 0.651 dL/g, a glass transition temperature of 126° C., and a color b value of 5.5. These results are shown in Table 9.

Example 42

The same procedure as in Example 39 was conducted, except that 71.1 g (0.487 mol) of isosorbide (formic acid content, 3 ppm) was weighed in a polymerization tube, subsequently stored for 15 days in an atmospheric environment of 40° C. and 80% RH, and then used. The isosorbide after the storage had a formic acid content of 6 ppm. The weight of the isosorbide increased by 24.4 g. The isosorbide absorbed moisture and became liquid.

The polycarbonate copolymer obtained had a reduced viscosity of 0.651 dL/g, a glass transition temperature of 126° C., and a color b value of 8.9. These results are shown in Table 9.

Example 43

The same procedure as in Example 39 was conducted, except that about 100 g of isosorbide (formic acid content, 3 ppm) was put in an aluminum bag together with two packages of Ageless (manufactured by Mitsubishi Gas Chemical Co., Ltd.) SA-100, stored for 18 days in an environment of 40° C. and 80% RH, and then used in an amount of 71.1 g (0.487 mol). The isosorbide after the storage had a formic acid content of 3 ppm. The weight of the isosorbide did not increase.

The polycarbonate copolymer obtained had a reduced viscosity of 0.642 dL/g, a glass transition temperature of 126° C., and a color b value of 5.9. These results are shown in Table 9.

Example 44

The same procedure as in Example 39 was conducted, except that about 100 g of isosorbide (formic acid content, 3 ppm) was put in an aluminum bag together with two packages of Ageless (manufactured by Mitsubishi Gas Chemical Co., Ltd.) SA-100, stored for 32 days in an environment of 40° C. and 80% RH, and then used in an amount of 71.1 g (0.487 mol). The isosorbide after the storage had a formic acid content of 5 ppm. The weight of the isosorbide did not increase.

The polycarbonate copolymer obtained had a reduced viscosity of 0.650 dL/g, a glass transition temperature of 126° C., and a color b value of 7.5. These results are shown in Table 9.

Example 45

The same procedure as in Example 39 was conducted, except that about 100 g of isosorbide (formic acid content, 3 ppm) was put in an aluminum bag together with two packages of Ageless (manufactured by Mitsubishi Gas Chemical Co., Ltd.) SA-100, stored for 59 days in an environment of 40° C. and 80% RH, and then used in an amount of 71.1 g (0.487 mol). The isosorbide after the storage had a formic acid content of 5 ppm. The weight of the isosorbide did not increase.

The polycarbonate copolymer obtained had a reduced viscosity of 0.624 dL/g, a glass transition temperature of 126° C., and a color b value of 7.1. These results are shown in Table 9.

Comparative Example 5

The same procedure as in Example 39 was conducted, except that 71.1 g (0.487 mol) of isosorbide (formic acid content, 3 ppm) was weighed in a polymerization tube, subsequently stored for 29 days in an atmospheric environment of 40° C. and 80% RH, and then used. The isosorbide after the storage had a formic acid content of 25 ppm. The weight of the isosorbide increased by 19.9 g. The isosorbide absorbed moisture and became liquid.

The polycarbonate copolymer obtained had a reduced viscosity of 0.231 dL/g and a color b value of 9.0. These results are shown in Table 9.

Comparative Example 6

The same procedure as in Example 39 was conducted, except that 71.1 g (0.487 mol) of isosorbide (formic acid content, 3 ppm) was weighed in a polymerization tube, subsequently stored for 57 days in an atmospheric environment of 40° C. and 80% RH, and then used. The isosorbide after the storage had a formic acid content of 40 ppm. The weight of the isosorbide increased by 20.3 g. The isosorbide absorbed moisture and became liquid.

No torque increase occurred, and no polymer was obtained.

Example 46

The same procedure as in Example 13 was conducted, except that use was made of isosorbide having a sodium content of 8.9 ppm (56.57 µmol per mole of the isosorbide) and a potassium content of 0.06 ppm (0.22 mol per mole of the isosorbide).

The polycarbonate obtained had a reduced viscosity of 0.601 dL/g, a glass transition temperature of 126° C., and a color b value of 17.3. These results are shown in Table 8.

Example 47

The same procedure as in Example 2 was conducted, except that use was made of isosorbide having a sodium content of 8.9 ppm (56.57 µmol per mole of the isosorbide) and a potassium content of 0.06 ppm (0.22 µmol per mole of the isosorbide) and CHDM having a sodium content of 0.01 ppm (0.063 µmol per mole of the CHDM) and a calcium content of 0.01 ppm (0.036 µmol per mole of the CHDM).

The polycarbonate obtained had a reduced viscosity of 0.596 dL/g, a glass transition temperature of 133° C., and a color b value of 16.5. These results are shown in Table 8.

The following can be seen from Examples 46 and 47. Polymerization reaction proceeds so long as the content of formic acid is low. However, high contents of alkali metals and alkaline earth metals enhance coloration.

TABLE 1

| | Feed amounts [parts by weight or weight (g)] note 3) | | | Feed molar ratio | | | |
|---|---|---|---|---|---|---|---|
| | | Dihydroxy compound other than ISOB | | | Dihydroxy compound other than | Proportion of DPC to all dihydroxy | Catalyst |
| | ISOB | Kind | Amount | DPC | ISOB | ISOB | compounds | Kind |

| | ISOB | Kind | Amount | DPC | ISOB | ISOB | compounds | Kind |
|---|---|---|---|---|---|---|---|---|
| Ex. 1 | 27.7 | 1,4-CHDM | 13.0 | 59.2 | 0.68 | 0.32 | 0.99 | cesium carbonate |
| Ex. 2 | 31.8 | 1,4-CHDM | 8.7 | 59.5 | 0.78 | 0.22 | 1.00 | cesium carbonate |
| Ex. 3 | 35.9 | 1,4-CHDM | 4.4 | 59.7 | 0.89 | 0.11 | 1.01 | cesium carbonate |
| Ex. 4 | 19.7 | 1,4-CHDM | 21.6 | 58.8 | 0.47 | 0.53 | 0.97 | cesium carbonate |
| Ex. 5 | 15.7 | 1,4-CHDM | 25.8 | 58.6 | 0.37 | 0.63 | 0.96 | cesium carbonate |
| Ex. 6 | 27.7 | 1,4-CHDM | 13.0 | 59.2 | 0.68 | 0.32 | 0.99 | cesium carbonate |
| Ex. 7 | 27.7 | 1,4-CHDM | 13.0 | 59.2 | 0.68 | 0.32 | 0.99 | sodium hydroxide |
| Ex. 8 | 28.2 | 1,4-CHDM | 13.3 | 58.5 | 0.68 | 0.32 | 0.96 | cesium carbonate |
| Ex. 9 | 27.7 | 1,4-CHDM | 13.0 | 59.2 | 0.68 | 0.32 | 0.99 | cesium carbonate |
| Ex. 10 | 27.7 | 1,4-CHDM | 13.0 | 59.2 | 0.68 | 0.32 | 0.99 | cesium carbonate |
| Ex. 11 | 27.7 | 1,4-CHDM | 13.0 | 59.2 | 0.68 | 0.32 | 0.99 | cesium carbonate |
| Ex. 12 | 19.7 | 1,4-CHDM | 21.6 | 58.8 | 0.47 | 0.53 | 0.97 | cesium carbonate |
| Ex. 13 | 26.9 | TCDDM | 15.8 | 57.4 | 0.7 | 0.3 | 1.01 | cesium carbonate |
| Ex. 14 | 35.5 | TCDDM | 5.4 | 59.0 | 0.9 | 0.1 | 1.02 | cesium carbonate |
| Ex. 15 | 31.1 | TCDDM | 10.7 | 58.2 | 0.8 | 0.2 | 1.02 | cesium carbonate |
| Ex. 16 | 22.7 | TCDDM | 20.7 | 56.6 | 0.6 | 0.4 | 1.00 | cesium carbonate |
| Ex. 17 | 18.7 | TCDDM | 25.6 | 55.8 | 0.5 | 0.5 | 1.01 | cesium carbonate |
| Ex. 18 | 14.7 | TCDDM | 30.3 | 55.0 | 0.4 | 0.6 | 1.01 | cesium carbonate |
| Ex. 19 | 25.6 | PCPDM | 19.7 | 54.7 | 0.7 | 0.3 | 1.02 | cesium carbonate |
| Ex. 20 | 54.7 | adamantane-dimethanol | 31.5 | 116.8 | 0.7 | 0.3 | 1.02 | cesium carbonate |
| Ex. 21 | 54.5 | biscyclo-hexanediol | 31.7 | 116.4 | 0.7 | 0.3 | 1.02 | cesium carbonate |
| Ex. 22 | 11.7 | 1,4-CHDM | 30.0 | 58.3 | 0.28 | 0.78 | 0.95 | cesium carbonate |
| Ex. 23 | 7.8 | 1,4-CHDM | 34.1 | 58.1 | 0.18 | 0.82 | 0.94 | cesium carbonate |
| Ex. 24 | 3.9 | 1,4-CHDM | 38.2 | 57.9 | 0.09 | 0.91 | 0.93 | cesium carbonate |
| Ex. 25 | 1.9 | 1,4-CHDM | 40.3 | 57.8 | 0.05 | 0.95 | 0.92 | cesium carbonate |
| Ex. 26 | 17.7 | TCDDM/BHEPF | 19.0/10.6 | 52.8 | 0.5 | 0.4/0.1 | 1.02 | sodium chloride |
| Ex. 27 | 40.1 | — | 0.0 | 59.9 | 1.00 | 0.00 | 1.02 | cesium carbonate |
| Ref. Ex. 1 | 0.0 | 1,4-CHDM | 42.3 | 57.7 | 0.00 | 1.00 | 0.92 | cesium carbonate |
| Ref. Ex. 5 | 0 | TCDDM | 47.8 | 58.2 | 0 | 1 | 1.00 | cesium carbonate |
| Ex. 28 | 85.61 | 1,4-BG | 22.6 | 166.8 | 0.7 | 0.3 | 0.93 | cesium carbonate |
| Ex. 29 | 81.22 | 1,6-HD | 28.2 | 161.6 | 0.7 | 0.3 | 0.95 | cesium carbonate |
| Ex. 30 | 63.84 | BCF/1,4-BG | 27.6/19.7 | 145.04 | 0.6 | 0.1/0.3 | 0.93 | cesium carbonate |
| Ex. 31 | 16.7 | TCDDM/BHEPF | 13.4/20.0 | 49.9 | 0.5 | 0.3/0.2 | 1.02 | sodium chloride |
| Ex. 32 | 15.8 | TCDDM/BHEPF | 8.5/28.5 | 47.3 | 0.5 | 0.2/0.3 | 1.02 | sodium chloride |

| | Catalyst Amount note 1) | Stabilizer note 2) | Polymerization temperature (° C.) | Reduced viscosity (dL/g) | Glass transition temperature (° C.) | Colorb |
|---|---|---|---|---|---|---|
| Ex. 1 | 5 | — | 250 | 1.007 | 124 | 8.8 |
| Ex. 2 | 5 | — | 240 | 0.757 | 133 | 8.2 |
| Ex. 3 | 5 | — | 240 | 0.712 | 148 | 9.1 |
| Ex. 4 | 5 | — | 250 | 1.196 | 101 | 7.7 |
| Ex. 5 | 5 | — | 240 | 1.186 | 89 | 5.1 |
| Ex. 6 | 5 | — | 240 | 0.979 | 124 | 9.5 |
| Ex. 7 | 8 | — | 240 | 0.965 | 123 | 9.4 |
| Ex. 8 | 5 | — | 240 | 0.496 | 122 | 9.6 |
| Ex. 9 | 0.5 | — | 240 | 0.910 | 124 | 9.8 |
| Ex. 10 | 25 | — | 240 | 0.980 | 124 | 8.3 |
| Ex. 11 | 5 | PEP-36 | 240 | 0.975 | 124 | 7.2 |
| Ex. 12 | 5 | PEP-36 | 240 | 0.850 | 100 | 3.6 |
| Ex. 13 | 5 | | 220 | 0.640 | 126 | 4.6 |
| Ex. 14 | 5 | | 220 | 0.546 | 144 | 6.4 |
| Ex. 15 | 5 | | 220 | 0.644 | 136 | 2.8 |
| Ex. 16 | 5 | | 220 | 0.637 | 118 | 2.3 |
| Ex. 17 | 5 | | 220 | 0.785 | 110 | 4.7 |
| Ex. 18 | 5 | | 240 | 0.672 | 102 | 9.2 |
| Ex. 19 | 5 | | 240 | 0.730 | 149 | 8.4 |
| Ex. 20 | 15 | | 230 | 0.409 | 125 | 14.8 |
| Ex. 21 | 5 | | 230 | 0.260 | 125 | 8.6 |
| Ex. 22 | 5 | — | 220 | 0.979 | 74 | 4.7 |
| Ex. 23 | 5 | — | 220 | 1.159 | 63 | 2.9 |
| Ex. 24 | 5 | — | 220 | 0.670 | 51 | 2.8 |
| Ex. 25 | 5 | — | 220 | 0.640 | 45 | 3.0 |
| Ex. 26 | 8 | | 240 | 0.668 | 122 | 11.2 |
| Ex. 27 | 5 | — | 250 | 0.679 | 160 | 13.0 |

TABLE 1-continued

|  |  |  |  |  |  |  |
|---|---|---|---|---|---|---|
| Ref. Ex. 1 | 5 | — | 220 | 0.662 | 40 | 4.5 |
| Ref. Ex. 5 | 5 |  | 220 | 0.899 | 73 | 3.9 |
| Ex. 28 | 2.5 |  | 220 | 0.568 | 116 | 12.4 |
| Ex. 29 | 2.5 |  | 220 | 1.063 | 85 | 8.9 |
| Ex. 30 | 2.5 |  | 220 | 0.464 | 129 | 8.3 |
| Ex. 31 | 8 |  | 240 | 0.624 | 123 | 9.7 |
| Ex. 32 | 8 |  | 240 | 0.586 | 133 | 8.4 |

Note 1)
The number of moles of metal per mole of all dihydroxy compounds (unit: μmol).

Note 2)
PEP-36 amount: 0.096 parts by weight in Examples 11 and 12.

Note 3)
The feed amounts in Examples 20, 21, 28, 29, and 30 are in weight (g), and the feed amounts in the other examples are in parts by weight.

TABLE 2

|  | Feed molar ratio between dihydroxy compounds | | | Reduced viscosity (dL/g) | Tensile strength at yield (MPa) | Tensile modulus at yield (MPa) | Elongation at yield (%) | Elongation at break (%) | Izod impact strength (J/m2) |
|---|---|---|---|---|---|---|---|---|---|
|  | Isosorbide | 1,4-CHDM | TCDDM |  |  |  |  |  |  |
| Example 1 | 0.68 | 0.32 |  | 1.007 | 84 | 748 | 16 | 30 | 227 |
| Example 4 | 0.47 | 0.53 |  | 1.196 | 66 | 595 | 16 | 27 | 293 |
| Example 5 | 0.37 | 0.63 |  | 1.186 | 59 | 541 | 15 | 70 | 784 |
| Example 6 | 0.68 | 0.32 |  | 0.979 | 78 | 691 | 16 | 47 | 184 |
| Example 13 | 0.7 |  | 0.3 | 0.640 | 89 | 834 | 15 | 76 | 48 |
| Example 14 | 0.9 |  | 0.1 | 0.546 | 106 | 872 | 16 | 26 | 65 |
| Example 15 | 0.8 |  | 0.2 | 0.644 | 107 | 934 | 16 | 39 | 58 |
| Example 17 | 0.5 |  | 0.5 | 0.785 | 79 | 807 | 13 | 18 | 58 |
| Example 18 | 0.4 |  | 0.6 | 0.672 | 76 | 850 | 12 | 31 | 40 |
| Example 27 | 1.0 | 0.0 |  | 0.679 | 105 | 353 | 17 | 31 | 11 |
| Reference Example 2 (Iupilon H4000) | — | — |  | 0.456 | 63 | 629 | 13 | 74 | 6 |
| Reference Example 3 (Iupilon S2000) | — | — |  | 0.507 | 63 | 565 | 13 | 85 | 641 |

TABLE 3

|  | Feed molar ratio between dihydroxy compounds | | | | | Refractive index | | | | Abbe number vd |
|---|---|---|---|---|---|---|---|---|---|---|
|  | ISOB | 1,4-CHDM | TCDDM | PCPDM | BHEPF | nD (589 nm) | nC (656 nm) | ne (546 nm) | nF (486 nm) |  |
| Example 1 | 0.68 | 0.32 |  |  |  | 1.4992 | 1.4969 | 1.5015 | 1.5056 | 58 |
| Example 2 | 0.78 | 0.22 |  |  |  | 1.5004 | 1.4980 | 1.5026 | 1.5068 | 57 |
| Example 3 | 0.89 | 0.11 |  |  |  | 1.5014 | 1.4991 | 1.5037 | 1.5079 | 57 |
| Example 4 | 0.47 | 0.53 |  |  |  | 1.4993 | 1.4970 | 1.5013 | 1.5052 | 61 |
| Example 5 | 0.37 | 0.63 |  |  |  | 1.4993 | 1.4969 | 1.5014 | 1.5050 | 62 |
| Example 13 | 0.7 |  | 0.3 |  |  | 1.5095 | 1.5070 | 1.5118 | 1.5153 | 62 |
| Example 14 | 0.9 |  | 0.1 |  |  | 1.5052 | 1.5027 | 1.5073 | 1.5111 | 60 |
| Example 15 | 0.8 |  | 0.2 |  |  | 1.5090 | 1.5065 | 1.5113 | 1.5148 | 61 |
| Example 16 | 0.6 |  | 0.4 |  |  | 1.5135 | 1.5110 | 1.5158 | 1.5198 | 58 |
| Example 17 | 0.5 |  | 0.5 |  |  | 1.5157 | 1.5131 | 1.5180 | 1.5217 | 60 |
| Example 18 | 0.4 |  | 0.6 |  |  | 1.5185 | 1.5159 | 1.5209 | 1.5249 | 58 |
| Example 19 | 0.7 |  |  | 0.3 |  | 1.5194 | 1.5167 | 1.5215 | 1.5254 | 60 |
| Example 22 | 0.28 | 0.78 |  |  |  | 1.5002 | 1.4980 | 1.5026 | 1.5066 | 56 |
| Example 23 | 0.18 | 0.82 |  |  |  | 1.5024 | 1.5000 | 1.5052 | 1.5094 | 56 |
| Example 26 | 0.5 |  | 0.4 |  | 0.1 | 1.5410 | 1.5374 | 1.5443 | 1.5502 | 42 |

TABLE 3-continued

| | Feed molar ratio between dihydroxy compounds | | | | | Refractive index | | | | Abbe number vd |
|---|---|---|---|---|---|---|---|---|---|---|
| | ISOB | 1,4-CHDM | TCDDM | PCPDM | BHEPF | nD (589 nm) | nC (656 nm) | ne (546 nm) | nF (486 nm) | |
| Reference Example 2 (Iupilon H4000) | | | | | | 1.5828 | 1.5776 | 1.5879 | 1.5970 | 30 |
| Example 31 | 0.5 | | 0.3 | | 0.2 | 1.5617 | 1.5574 | 1.5657 | 1.5731 | 36 |
| Example 32 | 0.5 | | 0.2 | | 0.3 | 1.5800 | 1.5748 | 1.5846 | 1.5935 | 31 |

TABLE 4

| | Feed molar ratio between dihydroxy compounds | | | | | | 5% weight loss temperature (°C.) |
|---|---|---|---|---|---|---|---|
| | Isosorbide | 1,4-CHDM | TCDDM | PCPDM | 1,4-BG | 1,6-HD | |
| Example 1 | 0.68 | 0.32 | | | | | 344 |
| Example 2 | 0.78 | 0.22 | | | | | 343 |
| Example 4 | 0.47 | 0.53 | | | | | 345 |
| Example 13 | 0.7 | | 0.3 | | | | 348 |
| Example 15 | 0.8 | | 0.2 | | | | 344 |
| Example 17 | 0.5 | | 0.5 | | | | 349 |
| Example 18 | 0.4 | | 0.6 | | | | 352 |
| Example 19 | 0.7 | | | 0.3 | | | 347 |
| Example 27 | 1.0 | 0.0 | | | | | 339 |
| Reference Example 4 (poly(lactic acid)) | | | | | | | 320 |
| Example 28 (ISOB/1,4-BG = 7/3) | 0.7 | | | | 0.3 | | 339 |
| Example 29 (ISOB/1,6-HD = 7/3) | 0.7 | | | | | 0.3 | 336 |

TABLE 5

| | Dihydroxy compounds | | Photoelastic coefficient (×10$^{-12}$Pa$^{-1}$) | Glass transition temperature (°C.) |
|---|---|---|---|---|
| | Feed composition | Feed molar ratio | | |
| Example 2 | ISOB/1,4-CHDM | 0.78/0.22 | 20 | 33 |
| Example 13 | ISOB/TCDDM | 0.7/0.3 | 9 | 126 |
| Example 16 | ISOB/TCDDM | 0.6/0.4 | 7 | 118 |
| Example 19 | ISOB/PCPDM | 0.7/0.3 | 8 | 149 |
| Reference Example 2 | Iupilon H4000 | | 72 | 145 |
| Example 28 | ISOB/1,4-BG | 0.7/0.3 | 23 | 116 |
| Example 29 | ISOB/1,6-HD | 0.7/0.3 | 20 | 85 |
| Example 30 | ISOB/1,4-BG/BCF | 0.6/0.3/0.1 | 23 | 129 |

TABLE 6

| | Dihydroxy compounds | | Amount of generated gases other than phenol ingredient (ng/cm$^2$) | Amount of generated gases derived from dihydroxy compounds other than dihydroxy compounds represented by general formula (1) (ng/cm$^2$) |
|---|---|---|---|---|
| | Feed composition | Feed molar ratio | | |
| Example 1 | ISOB/CHDM | 0.68/0.32 | 3.7 | 0 |
| Example 13 | ISOB/TCDDM | 0.7/0.3 | 4.5 | 0 |
| Example 28 | ISOB/1,4-BG | 0.7/0.3 | 10.0 | 2.0[note1] |
| Example 29 | ISOB/1,6-HD | 0.7/0.3 | 11.0 | 5.0[note2] |

[note1] THF
[note2] cyclohexadiene, cyclohexyl phenyl ether

TABLE 7

| | Feed molar ratio between dihydroxy compounds | Pencil hardness |
|---|---|---|
| Example 6 | ISOB/CHDM = 0.68/0.32 | H |
| Example 8 | ISOB/CHDM = 0.68/0.32 | H |
| Example 13 | ISOB/TCDDM = 0.7/0.3 | F |
| Reference Example 2 | (lupilon H4000) | 2B |
| Example 29 | ISOB/1,6-HD = 0.7/0.3 | HB |

TABLE 8

| | Distillation of ISOB | Amount of formic acid in ISOB (ppm) | ISOB lot used | Amount of metals in ISOB (μmol) note 1) | Other dihydroxy compound | Amount of metals in the other dihydroxy compound (μmol) note 2) | Feed ratio [ISOB/other dihydroxy compound (molar ratio)] | Amount of metals in all dihydroxy compounds (μmol) note 3) | Reduced viscosity (dL/g) | Glass transition temperature Tig (°C.) | Color b |
|---|---|---|---|---|---|---|---|---|---|---|---|
| Ex. 33 | not conducted | 5 | Lot. A | 0.26 | TCDDM | 0 | 0.7/0.3 | 0.18 | 0.506 | 126 | 10.0 |
| Ex. 34 | not conducted | 5 | Lot. A | 0.26 | CHDM | 0.099 | 0.68/0.32 | 0.21 | 0.621 | 123 | 11.0 |
| Ex. 35 | conducted | 3 | Lot. B | 1.27 | TCDDM | 0 | 0.7/0.3 | 0.89 | 0.510 | 126 | 4.5 |
| Ex. 36 | conducted | 2 | Lot. C | 0.13 | TCDDM | 0 | 0.7/0.3 | 0.09 | 0.640 | 126 | 3.7 |
| Ex. 37 | conducted | 3 | Lot. B | 1.27 | CHDM | 0.099 | 0.78/0.22 | 1.01 | 0.658 | 133 | 7.0 |
| Ex. 38 | conducted | 2 | Lot. C | 0.13 | CHDM | 0.099 | 0.78/0.22 | 0.12 | 0.590 | 133 | 6.5 |
| Comp. Ex. 1 | not conducted | 400 | Lot. D | 76.58 | TCDDM | 0 | 0.7/0.3 | 53.6 | not polymerized | — | — |
| Comp. Ex. 2 | not conducted | 50 | Lot. D | 76.58 | TCDDM | 0 | 0.7/0.3 | 53.6 | not polymerized | — | — |
| Comp. Ex. 3 | not conducted | 20 | Lot. E | 56.80 | TCDDM | 0 | 0.7/0.3 | 39.8 | not polymerized | — | — |
| Comp. Ex. 4 | not conducted | 50 | Lot. D | 76.58 | CHDM | 0.099 | 0.78/0.22 | 59.8 | not polymerized | — | — |
| Ex. 46 | not conducted | 5 | Lot. F | 56.80 | TCDDM | 0 | 0.7/0.3 | 39.8 | 0.601 | 126 | 17.3 |
| Ex. 47 | not conducted | 5 | Lot. F | 56.80 | CHDM | 0.099 | 0.78/0.22 | 44.3 | 0.596 | 133 | 16.5 |

Note 1)
The number of moles of alkali metals and alkaline earth metals (total amount) per mole of the isosorbide.
Note 2)
The number of moles of alkali metals and alkaline earth metals (total amount) per mole of the other dihydroxy compound.
Note 3)
The number of moles of alkali metals and alkaline earth metals (total amount) per mole of all dihydroxy compounds.

TABLE 9

| | Distillation of ISOB | Amount of formic acid in ISOB (ppm) | Condition of storage | Number of days of storage note 1) | Reduced viscosity (dL/g) | Glass transition temperature Tig (°C.) | Color b |
|---|---|---|---|---|---|---|---|
| Example 39 | conducted | 3 | aluminum bag | 0 | 0.657 | 126 | 6.8 |
| Example 40 | conducted | 5 | in the air | 8 | 0.672 | 126 | 7.6 |
| Example 41 | conducted | 3 | aluminum bag | 10 | 0.651 | 126 | 5.5 |
| Example 42 | conducted | 6 | in the air | 15 | 0.651 | 126 | 8.9 |
| Example 43 | conducted | 3 | aluminum bag | 18 | 0.642 | 126 | 5.9 |
| Example 44 | conducted | 5 | aluminum bag | 32 | 0.650 | 126 | 7.5 |
| Example 45 | conducted | 5 | aluminum bag | 59 | 0.624 | 126 | 7.1 |
| Comparative Example 5 | conducted | 25 | in the air | 29 | 0.231 | — | 9.0 |
| Comparative Example 6 | conducted | 40 | in the air | 57 | not polymerized | — | — |

Note 1)
Storage conditions for ISOB include 40° C. and 80% RH.

TABLE 10

| Element to be detected | Atomic weight of element | Minimum concentration limit of detection by ICP-MS (μg/g) | Minimum limit of detection of each element in ISOB (μmol) note 1) | Minimum limit of detection of each element in TCDDM (μmol) note 2) | Minimum limit of detection of each element in CHDM (μmol) note 3) |
|---|---|---|---|---|---|
| Li | 6.9 | 0.01 | 0.21 | 0.28 | 0.21 |
| Na | 23.0 | 0.01 | 0.064 | 0.085 | 0.063 |
| K | 39.1 | 0.02 | 0.037 | 0.050 | 0.037 |
| Cs | 132.9 | 0.01 | 0.011 | 0.015 | 0.011 |

TABLE 10-continued

| Element to be detected | Atomic weight of element | Minimum concentration limit of detection by ICP-MS (μg/g) | Minimum limit of detection of each element in ISOB (μmol) note 1) | Minimum limit of detection of each element in TCDDM (μmol) note 2) | Minimum limit of detection of each element in CHDM (μmol) note 3) |
|---|---|---|---|---|---|
| Mg | 24.3 | 0.01 | 0.060 | 0.081 | 0.059 |
| Ca | 40.1 | 0.01 | 0.036 | 0.049 | 0.036 |
| Ba | 137.3 | 0.01 | 0.011 | 0.014 | 0.011 |

Note 1), Note 2), Note 3)
The number of moles per mole of each dihydroxy compound.

TABLE 11

| Element | ISOB Lot. A | ISOB Lot. B | ISOB Lot. C | ISOB Lot. D | ISOB Lot. E | ISOB Lot. F | TCDDM | CHDM |
|---|---|---|---|---|---|---|---|---|
| Li | — | — | — | — | — | — | — | — |
| Na | 0.03 | 0.17 | 0.02 | 12.00 | 8.90 | 8.90 | — | 0.01 |
| K | — | — | — | 0.06 | 0.06 | 0.06 | — | — |
| Cs | — | — | — | — | — | — | — | — |
| Mg | — | 0.02 | — | — | — | — | — | — |
| Ca | 0.02 | 0.02 | — | 0.02 | — | — | — | 0.01 |
| Ba | — | — | — | — | — | — | — | — |

Note)
Unit is ppm.
"—" indicates a concentration below the detection limit.

TABLE 12

| Element | ISOB Lot. A | ISOB Lot. B | ISOB Lot. C | ISOB Lot. D | ISOB Lot. E | ISOB Lot. F | TCDDM | CHDM |
|---|---|---|---|---|---|---|---|---|
| Li | — | — | — | — | — | — | — | — |
| Na | 0.19 | 1.08 | 0.13 | 76.28 | 56.57 | 56.57 | — | 0.063 |
| K | — | — | — | 0.22 | 0.22 | 0.22 | — | — |
| Cs | — | — | — | — | — | — | — | — |
| Mg | — | 0.12 | — | — | — | — | — | — |
| Ca | 0.073 | 0.073 | — | 0.073 | — | — | — | 0.036 |
| Ba | — | — | — | — | — | — | — | — |
| Total | 0.26 | 1.27 | 0.13 | 76.58 | 56.80 | 56.80 | 0.000 | 0.099 |

Note)
Unit is the number of moles (μmol) per mole of each dihydroxy compound.
"—" indicates a concentration below the detection limit.

It can be seen from Table 2 that the polycarbonates of the invention are equal or superior to the commercial polycarbonates in tensile strength at yield, tensile modulus at yield, and elongation at yield and have a high Izod impact strength.

It can be seen from Table 3 that the polycarbonates of the invention have lower refractive indexes and a larger Abbe number than the commercial polycarbonate and the conventional polycarbonates.

It can be seen from Table 4 that the polycarbonates of the invention have higher thermal stability than the commercial poly(lactic acid) and the conventional polycarbonates.

From the results given above, it can be seen that the polycarbonates of the invention have excellent mechanical strength, satisfactory heat resistance, a low refractive index, a large Abbe number, and excellent transparency and can be suitable for use as or in optical materials or various molding materials.

It can be seen from Table 5 that the polycarbonates of the invention have a low photoelastic coefficient and can be suitable for use as optical materials such as films or lenses.

It can be seen from Table 6 that the polycarbonates obtained by copolymerization with an alicyclic dihydroxy compound are reduced in gas generation. Namely, the polycarbonates produced using alicyclic diols such as cyclohexanedimethanol and tricyclodecanedimethanol undergo substantially no gas generation. It can hence be seen that such alicyclic-diol-containing polycarbonates, when used as optical films or the like in domestic electrical appliances or the like, exert a limited influence on the environment.

It can be seen from Table 7 that the polycarbonates of the invention have a high pencil hardness and high surface hardness and can be suitable for use in film applications where surface marring should be avoided or in structural-material applications such as housings.

It can be seen from Table 8 that polycarbonates having a lower degree of coloration are obtained by using isosorbide from which formic acid has been removed by distillation, etc.

It can be seen from Table 9 that the content of formic acid increases depending on storage methods and the isosorbide comes not to polymerize. It can be seen that when isosorbide which has been stored in an oxygen-free environment is used, a polycarbonate having a lower degree of coloration is stably obtained.

While the invention has been described in detail and with reference to specific embodiments thereof, it will be apparent to one skilled in the art that various changes and modifications can be made therein without departing from the spirit and scope thereof.

This application is based on a Japanese patent application filed on Dec. 12, 2007 (Application No. 2007-321408) and a Japanese patent application filed on Dec. 12, 2007 (Application No. 2007-321410), the entire contents thereof being herein incorporated by reference.

INDUSTRIAL APPLICABILITY

The polycarbonate of the invention is suitable for use in the field of films or sheets where flexibility is required, in the field of bottles or containers where heat resistance is necessary, as various structural materials required to have impact strength, in lens applications such as camera lenses, finder lenses, and lenses for CCDs or CMOSs, and in other applications including films or sheets for use in liquid-crystal or plasma displays, such as retardation films, diffusion sheets, and polarizing films, and binders for fixing optical disks, films, sheets, optical materials, optical parts, dyes or charge transfer agents, etc.

The invention claimed is:

1. A process for producing a polycarbonate, the process comprising reacting one or more dihydroxy compounds comprising a dihydroxy compound having at least one linking —$CH_2$—O— group with a carbonic acid diester in the presence of a polymerization catalyst, to form a polycarbonate, wherein:
the polymerization catalyst comprises at least one metal compound selected from the group consisting of an alkali metal compound and an alkaline earth metal compound;
an amount of an alkali and/or alkaline earth metal compound contained in the one or more dihydroxy compounds is 5 μmol or smaller, in terms of an amount of metal(s) contained per mole of the one or more dihydroxy compounds reacted as starting material; and
the dihydroxy compound having at least one linking —$CH_2$—O— group has a formic acid content of 3 ppm or lower than 20 ppm.

2. The process according to claim 1, wherein an addition amount of the at least one metal compound of the polymerization catalyst ranges from 0.1 μmol to 25 μmol in terms of the amount of metal(s) added per mole of the one or more dihydroxy compounds reacted.

3. The process according to claim 1, wherein the one or more dihydroxy compounds further comprise at least one other dihydroxy compound selected from the group consisting of an alicyclic dihydroxy compound, an aliphatic dihydroxy compound, an oxyalkylene glycol, an aromatic dihydroxy compound, and a diol having a cyclic ether structure.

4. The process according to claim 1, wherein the dihydroxy compound having at least one linking —$CH_2$—O— group is a dihydroxy compound represented by formula (1):

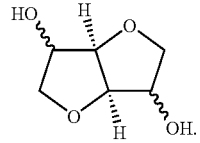

(1)

5. The process according to claim 4, wherein the dihydroxy compound represented by formula (1) has been stored under at least one condition selected from the group consisting of an inert gas atmosphere, a reduced-pressure atmosphere, in the presence of a free-oxygen absorber, in the presence of a desiccant, and at a temperature of 40° C. or lower.

6. The process according to claim 4, wherein the dihydroxy compound represented by formula (1) is reacted in a liquid state with the carbonic acid diester.

7. The process according to claim 4, wherein a proportion of the dihydroxy compound represented by formula (1) relative to the one or more dihydroxy compounds is 10% by mole or higher.

8. The process according to claim 4, wherein the one or more dihydroxy compounds further comprise at least one other dihydroxy compound selected from the group consisting of an alicyclic dihydroxy compound, an aliphatic dihydroxy compound, an oxyalkylene glycol, an aromatic dihydroxy compound, and a diol having a cyclic ether structure.

9. The process according to claim 4, wherein an addition amount of the at least one metal compound of the polymerization catalyst ranges from 0.1 μmol to 25 μmol in terms of the amount of metal or metals added per mole of the one or more dihydroxy compounds reacted.

10. The process according to claim 9, wherein the dihydroxy compound represented by formula (1) has been stored under at least one condition selected from the group consisting of an inert gas atmosphere, a reduced-pressure atmosphere, in the presence of a free-oxygen absorber, in the presence of a desiccant, and at a temperature of 40° C. or lower.

11. The process according to claim 9, wherein a proportion of the dihydroxy compound represented by formula (1) relative to the one or more dihydroxy compounds is 10% by mole or higher.

* * * * *